US008737463B2

(12) United States Patent
Kuroda et al.

(10) Patent No.: US 8,737,463 B2
(45) Date of Patent: May 27, 2014

(54) IMAGE ENCODING DEVICE AND IMAGE DECODING DEVICE

(75) Inventors: Shinichi Kuroda, Tokyo (JP); Shunichi Sekiguchi, Tokyo (JP); Kohtaro Asai, Tokyo (JP); Hirofumi Nishikawa, Tokyo (JP); Yoshimi Isu, Tokyo (JP); Yuri Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/155,483

(22) Filed: Jun. 20, 2005

(65) Prior Publication Data

US 2005/0232364 A1  Oct. 20, 2005

Related U.S. Application Data

(60) Division of application No. 09/545,172, filed on Apr. 6, 2000, now Pat. No. 6,983,014, which is a continuation of application No. PCT/JP98/00941, filed on Mar. 6, 1998.

(30) Foreign Application Priority Data

Oct. 20, 1997  (JP) .......................... PCT/JP97/03785

(51) Int. Cl.
*H04N 7/12* (2006.01)

(52) U.S. Cl.
USPC .................................................. 375/240.02

(58) Field of Classification Search
USPC ................. 375/240, 240.01, 240.02, 240.12, 375/240.25, 240.16; 348/406.1, 423.1
See application file for complete search history.

(56) References Cited

U.S. PATENT DOCUMENTS 5,539,663 A * 7/1996 Agarwal .................... 348/406.1
5,694,173 A * 12/1997 Kimura et al. ............. 348/423.1

(Continued)

FOREIGN PATENT DOCUMENTS

JP  07-107514 A1  4/1995
JP  08-294127       11/1996

(Continued)

OTHER PUBLICATIONS

MPEG-4 Video Transmission via DAB: Error Detection and Error Concealment and "MPEG-4 Video Verification Model Version 7.0" ISO-IEC/JTC1/SC29/WG11 N1642, Apr. 1997, section 2.1 MPEG-4 Video Coding, pages.*

(Continued)

*Primary Examiner* — Allen Wong
(74) *Attorney, Agent, or Firm* — Birch, Stewart, Kolasch & Birch, LLP.

(57) ABSTRACT

An image decoding method and device which decodes an encoded bit steam of a video object is disclosed. A VOP decoder decodes a VOP that is image data serving as an encoding unit of a video object; and a VOL header analyzing part decodes a 1-bit VOP rate flag, contained in encoded form in a header information part of a VOL layer composed of several VOPs, for indicating that a display rate in the VOL of the VOP to be decoded by the VOP decoder is a fixed rate. A coding parameter analyzer analyzes a parameter of the encoded bit stream to restore an information to indicate that temporal distance between any two successive video frames to be displayed is constant in the video sequence by the information only, the information being analyzed prior to a decoding process for a data area representing the video frames.

8 Claims, 29 Drawing Sheets

(56) References Cited

U.S. PATENT DOCUMENTS

| | | | |
|---|---|---|---|
| 5,790,196 | A | 8/1998 | Sun et al. |
| 5,899,575 | A | 5/1999 | Okayama et al. |
| 5,969,764 | A | 10/1999 | Sun et al. |
| 5,990,957 | A | 11/1999 | Ryoo |
| 6,028,539 | A | 2/2000 | Matsui |
| 6,031,575 | A * | 2/2000 | Suzuki et al. ............ 375/240.14 |
| 6,057,884 | A | 5/2000 | Chen et al. |
| 6,075,576 | A | 6/2000 | Tan et al. |
| 6,173,013 | B1 * | 1/2001 | Suzuki et al. ............ 375/240.16 |
| 6,233,356 | B1 | 5/2001 | Haskell et al. |
| 6,266,370 | B1 | 7/2001 | Kamikura et al. |
| 6,983,014 | B1 * | 1/2006 | Kuroda et al. ............ 375/240.02 |

FOREIGN PATENT DOCUMENTS

| | | |
|---|---|---|
| JP | 8-294127 A | 11/1996 |
| JP | 09-116897 | 5/1997 |
| JP | 9-116897 A | 5/1997 |
| JP | 9-224216 A | 8/1997 |

OTHER PUBLICATIONS

S. Sekiguchi et al., "The Insertions of VOP Rate Information," ISO/IEC JTC1/SC29/WG11 MPEG 97/2747, Oct. 20, 1997, pp. 1-3, XP002374596.

"MPEG-4 Requirements, Draft Version 5," ISO/IEC JTC1/SC29/WG11 MPEG97/2688, Oct. 19, 1997, pp. 1-26, XP002374597, Fribourg.

MPEG-4 Requirements, International Organisation for Standardisation Organisation Internationale De Normalisation ISO/IEC JTC1/SC29/WG11, Coding of Moving Pictures and Audio, Version 3, Apr. 1997, pp. 1-25, XP-001091541.

MPEG-2, 1995-2006 Tsinghua Tongfang Optical Disc. Co., Ltd., Apr. 30, 1996.

Ebrahimi, T., C. Horne, J. Ostermann and E.S. Jang, "Working Draft 4.0 of ISO/IEC 14496-2," International Organisation for Standardisation, Video & SNHC Groups, Jul. 27, 1997, pp. i-x and 1-140, Stockholm.

Ebrahimi, T., C. Horne, J. Ostermann, A. Puri and Y. Nakaya, "MPEG-4 Version 2 Visual Working Draft Rev 2.0," International Organisation for Standardisation, Video & SNHC Groups, Feb. 6, 1998, pp. i-xi and 1-42, San Jose.

Tan, T.K., and S.M. Shen, "VOP Time Increment Resolution," International Organisation for Standardisation, Proposal, Jul. 1997, pp. 1-3.

Aign et al., MPEG-4 Video Transmission via DAB: Error Detection and Error Concealment and "MPEG-4 Video Verification Model Version 7.0," ISO-IEC/JTC1/SC29/WG11 N1642, Apr. 1997, Section 2.1, MPEG-4 Video Coding.

Sikora, The MPEG-4 Video Standard Verification Model, Feb. 1997, IEEE Transactions on Circuits and Systems for Video Technology, vol. 7, No. 1, pp. 19-31.

Puri, MPEG-4: An Object-based Multimedia Coding Standard Supporting Mobile Applications, Aug. 1997, ACM Mobile Networks and Applications Journal, Special Issue on Mobile Multimedia Communications, see Fig. 11, Section 4.1, Section 6.4.

D. K. Fibush, "Timing and Synchronization Using MPEG-2 Transport Streams," SMPTE Journal, SMPTE Inc., Scarsdale, N.Y., U.S. vol. 105, No. 7, Jul. 1, 1996, pp. 395-400, XP000597142.

"Video Bitstream Syntax and Semantics," ISO Standard 13818.2, Jul. 1, 1995, pp. 23-62, XP002243439.

"MPEG97/N1796: Bitstream Syntax," ISO/IEC JTC1/SC29/WG11, Jul. 1997, pp. 114-168, XP002243400.

Supplementary Partial European Search Report, dated Jun. 5, 2003 or EP 98 90 5800.

* cited by examiner

IMAGE ENCODING DEVICE AND IMAGE DECODING DEVICE

CROSS-REFERENCE TO THE RELATED APPLICATION

This application is a Divisional of application Ser. No. 09/545,172 filed on Apr. 6, 2000 now U.S. Pat. No. 6,983,014 and for which priority is claimed under 35 U.S.C. §120. Application Ser. No. 09/545,172 is a continuation of International Application No. PCT/JP98/00941, whose international filing date is Mar. 6, 1998. The entire contents of each of the above-identified applications are hereby incorporated by reference.

BACKGROUND OF THE INVENTION

1. Field of the Invention

The present invention relates to an image encoding device and an image decoding device which perform image processing.

2. Description of the Prior Art

Conventionally, it is always necessary at the decoding side that the analysis of VOP (Video Object Plane) header information be preceded by analysis of a VOP start code, a modulo time base and a VOP time increment contained in each VOP header, because no distinction can be made between VOPs not to be analyzed (information to be decimated in the case of a low speed shot of an image signal) and those to be analyzed (information not to be decimated). Accordingly, the decoding process is inevitably cumbersome and prone to low accuracy.

For decoding and synthesizing encoded signals respectively corresponding to a subject, a background, a logo and similar objects which form a pictorial image, it is necessary that each object be added with a synthesizing timing signal (information representing absolute time) necessary for decoding and synthesizing the object. Without such absolute time information, the image decoding device cannot synthesize the object, and hence it is incapable of image reconstruction. In short, in the case of generating one pictorial image from a plurality of objects including those having no absolute time information, it is impossible with the prior art to combine objects having the required information with those having no such information.

Moreover, the bit length of the modulo time base increases until the next GOV header is multiplexed—this raises a problem that the bit length of the modulo time base keeps on increasing when the GOV header, which is an option, is not multiplexed.

SUMMARY OF THE INVENTION

It is therefore an object of the present invention to provide an image encoding and an image decoding device which are free from the abovesaid defects of the prior art and highly accurate in image processing but simple-structured.

Another object of the present invention is to provide an image encoding and an image decoding device which permit the generation of a pictorial image composed of a plurality of objects based on a time code.

Still another object of the present invention is to provide an image encoding and an image decoding device which perform required image processing with only limited amounts of information necessary therefor.

According to an aspect of the present invention, an image decoding device which decodes an encoded bit steam of a video object is disclosed. The decoding device includes a VOP decoder decoding a VOP that is image data serving as an encoding unit of a video object; and a VOL header analyzing part decoding a 1-bit VOP rate flag, contained in encoded form in a header information part of a VOL layer composed of several VOPs, for indicating that a display rate in the VOL of the VOP to be decoded by the VOP decoder is a fixed rate.

According to another aspect of the present, an image decoding method for decoding an encoded bit stream of a video object is disclosed. The method includes a VOP decoding step of decoding a VOP that is image data serving as an encoding unit of the video object; and a VOL header analyzing step of decoding a 1-bit VOP rate flag, contained in encoded form in a header information part of a VOL layer composed of several VOPs, for indicating that a display rate in the VOL of the VOP to be decoded by the VOP decoding step is a fixed rate.

According to yet another aspect of the present invention, the header information part further includes display speed information defining the number of VOPs displayed per unit time. According to a further aspect of the present invention, the image decoding device includes display speed information decoding means for decoding the header information part of the encoded bit stream to restore the display speed information to indicate the number of VOPs displayed per unit time.

According to another aspect of the present invention, the image decoding method includes decoding display speed information from the header information part of the encoded bit stream to determine the number of VOPs displayed per unit time.

According to yet another aspect of the present invention, an image decoding device which decodes an encoded bit stream formed by encoding a video sequence is disclosed. The image decoding device includes a coding parameter analyzer analyzing a parameter of the encoded bit stream to restore an information to indicate that temporal distance between any two successive video frames to be displayed is constant in the video sequence by said information only, the information being analyzed prior to a decoding process for a data area representing the video frames.

According to a further aspect of the present invention, a method of decoding an encoded bit stream formed by encoding a video sequence is disclosed. The method includes analyzing a parameter of the encoded bit stream to restore an information to indicate that temporal distance between any two successive video frames to be displayed is constant in the video sequence by said information only, the information being analyzed prior to a decoding process for a data area representing the video frames.

BRIEF DESCRIPTION OF THE DRAWINGS

Other objects, features and advantages of the present invention will become more apparent from the following description taken in conjunction with the accompanying drawings, in which.

DETAILED DESCRIPTION OF THE PREFERRED EMBODIMENTS

To facilitate a better understanding of the present invention, a description will be given, with reference to the accompanying drawings, of the best mode for carrying out the invention.

Embodiment 1

An image encoding device according to a first embodiment (Embodiment 1) of the present invention will be described as being applied to the MPEG-4 video encoding system disclosed in ISO/IEC JTC11 SC29/WG11/N1796. The VOP encoder of this embodiment is provided with means for encoding an image on the basis of object display speed information and means for multiplexing the object display speed information onto an image-encoded bit stream by adding the information for each object.

Figure 1:
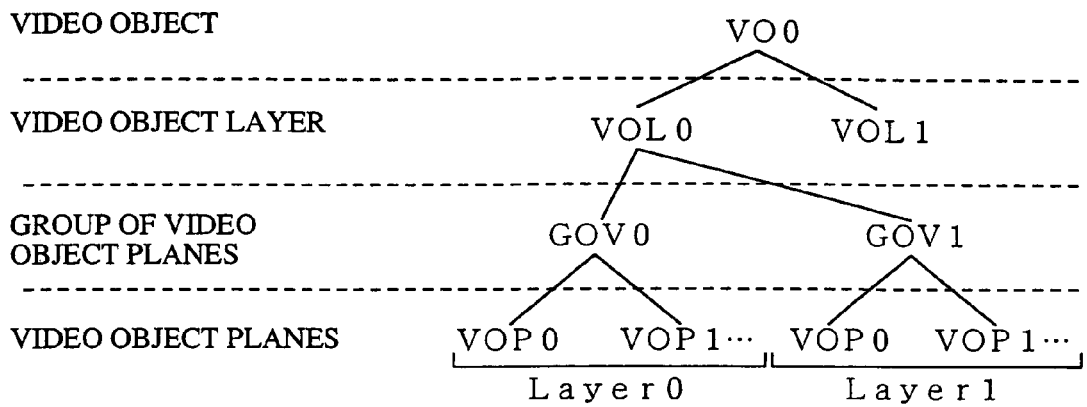
FIG. 1 is a diagram depicting the video data structure according to MPEG-4.

The MPEG-4 system is a system that regards a moving picture sequence as a set of moving picture objects taking arbitrary forms temporally and spatially and performs encoding and decoding for each moving picture object. In FIG. 1 there is depicted the video data structure in MPEG-4. In MPEG-4: the moving picture object containing the time axis is called a video object [Video Object (hereinafter referred to as VO)]; a component of the VO is called a video object layer {Video Object Layer (hereinafter referred to as VOL)]; a component of the VOL is called a group of video object planes (Group of Video Object Planes (hereinafter referred to as GOV)]; and image data which represents the state of the GOV at each time and forms the basic unit for encoding is called a video object plane [Video Object Plane (hereinafter referred to as VOP)]. The VO corresponds, for example, to each speaker or the background in a video conference scene. The VOL forms the basic unit having inherent temporal and spatial resolutions of the speaker or background. And the VOP is image data of such a VOL at each time (corresponding to a frame). The GOV is a data structure that forms the basic unit for editing a plurality of VOLs or random access thereto; this data structure need not always be used for encoding.

Figure 2:
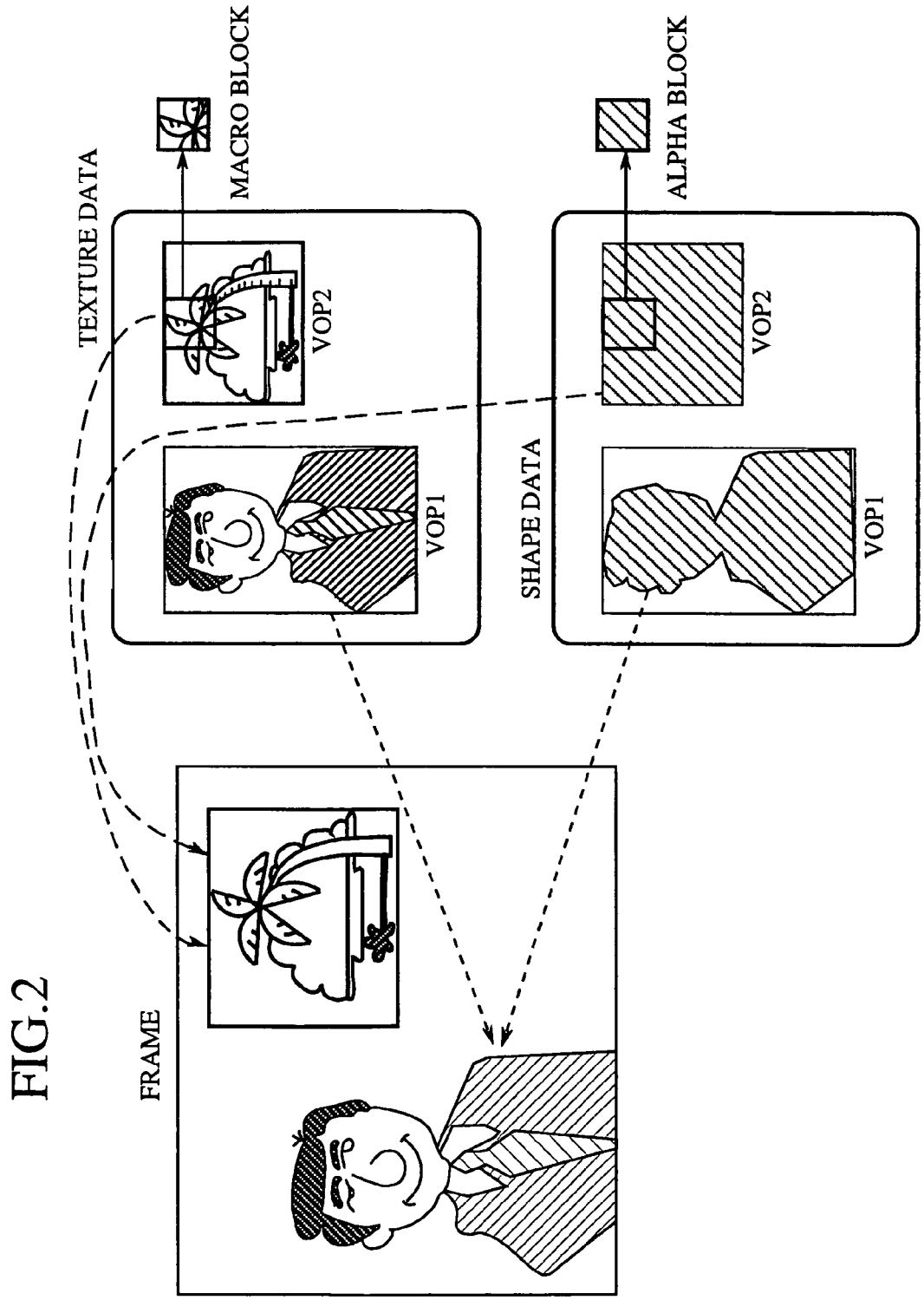
FIG. 2 is a diagram showing a concrete example of VOP.

A concrete example of VOP is shown in FIG. 2. In FIG. 2 there are depicted two VOPs (VOP1 indicating a man and VOP2 a picture on the wall). Each VOP is composed of texture data representing the color gradation level and shape data representing the shape of the VOP. The texture data is composed of a luminance signal of 8 bits per pixel and a color difference signal (of a size subsampled to ½ that of the luminance signal in the horizontal and vertical directions). The shape data is the same binary matrix data as the image size of the luminance signal which sets the inside and outside of the VOP at 0 and 1, respectively.

In the VOP-based moving picture representation a conventional frame image is obtained by arranging a plurality of VOPs in the frame. When the moving picture sequence contains only one VO, each VOP is synonymous with the frame.

In this instance, no shape data exists and only the texture data is encoded. A description will be given below of the image encoding device of Embodiment 1. This is based on an MPEG-4 video encoder, which will hereinafter be referred to as a VOP encoder since it performs encoding for each VOP. The operation of the existing VOP encoder is disclosed, for example, in ISO/IEC JTC1/SC29/WG11/N1796, and hence it will not be described here, but instead a description will be given of a VOP, encoder that contains constituents of Embodiment 1.

Figure 3:
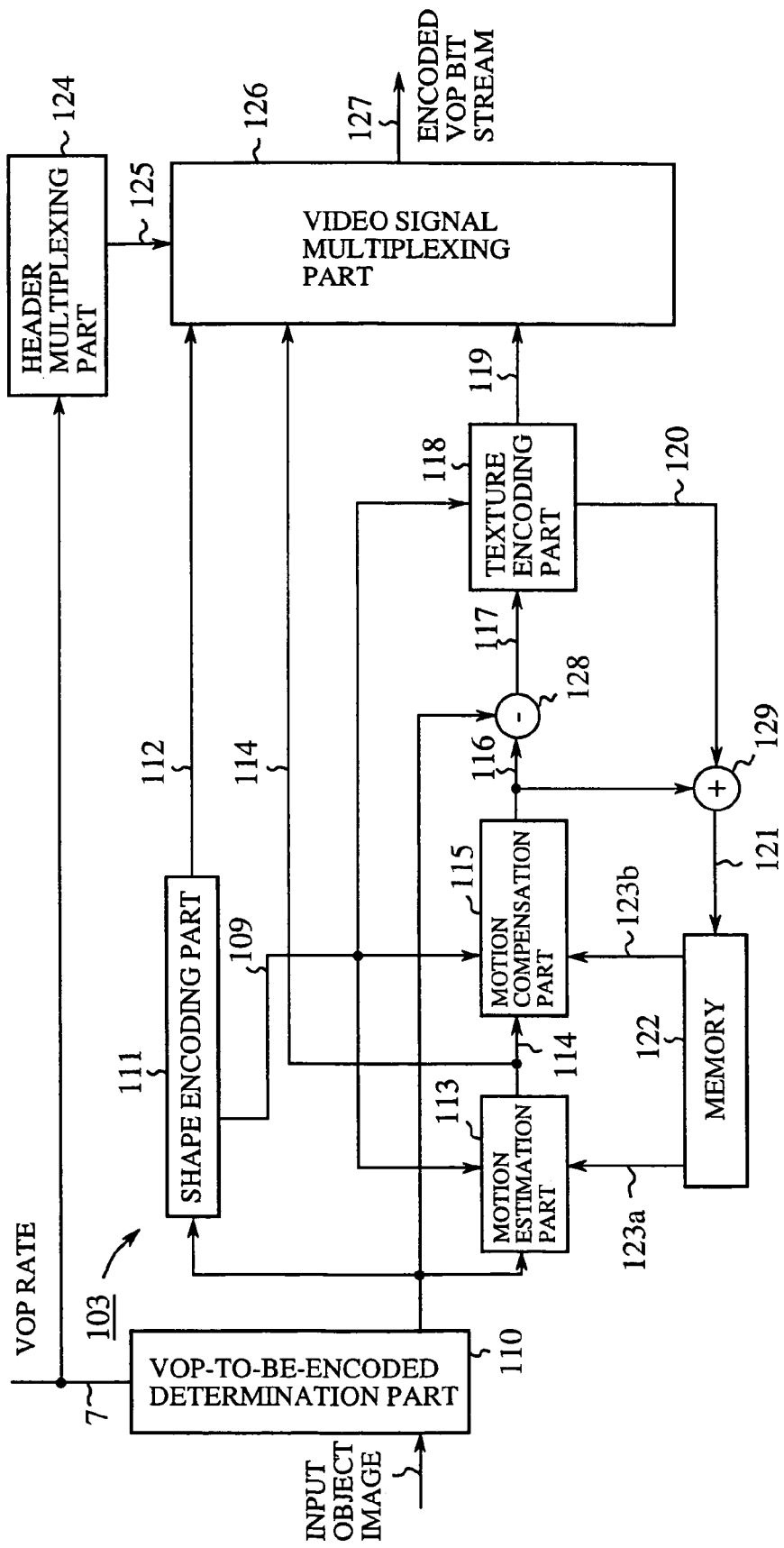
FIG. 3 is a block diagram illustrating a VOP encoder part according to a first embodiment of the present invention.

FIG. 3 depicts in block form an example of the configuration of the VOP encoder according to Embodiment 1. Reference numeral 110 denotes a VOP-to-be-encoded determination part, 111 a shape encoding part, 113 a motion estimation part, 115 a motion compensation part, 118 a texture encoding part, 122 a memory, 124 a header multiplexing part, 126 a video signal multiplexing part, 128 a subtractor, and 129 an adder.

Next, the operation of the VOP encoder will be described. Based on a VOP rate 7 that is set externally or in accordance with the encoding condition, the VOP-to-be-encoded determination part 110 determines the VOP to be encoded in the input object images, and outputs the VOP to be encoded to the shape encoding part 111, the motion estimation part 113 and the subtractor 128. The VOP rate 7 mentioned herein refers to a value that represents how many VOPs in each VOL or GOV are to be displayed per second. And the VOP rate information also mentioned herein is a code word corresponding to the VOP rate 7, and it is equivalent to what is called the display speed information in the present invention.

The operation of the VOP-to-be-encoded determination part 110 will be described concretely. When the number of input object images is 30/sec and the VOP rate 7 is 15/sec, the VOP-to-be-encoded determination part 110 judges that alternate ones of the VOPs contained in the input object images are to be encoded, and outputs every other VOPs to be encoded.

The VOPs specified by the VOP-to-be-encoded determination part 110 as those to be encoded have their shape data encoded for each area with 16 by 16 pixels, which is commonly called an alpha block, and have their texture data encoded for each area with 16 by 16 pixels which is called a macro block.

The shape encoding part 111 encodes the alpha block input thereto and outputs encoded shape information 112 and locally decoded shape information 109. The encoded shape information 112 is fed to the video signal multiplexing part 126. The locally decoded shape information 109 is input into the motion estimation part 113, the motion compensation part 115 and the texture encoding part 118. The motion estimation part 113 reads out reference data 123a from the memory 122 and performs block matching for each macro block to obtain motion information 114. At the same time, the motion estimation part 113 gets motion information by block matching of only the objects in the macro block on the basis of the locally decoded shape information 109.

The motion compensation part 115 reads out of the memory 122 reference data 123b on the position indicated by the motion information 114 and generates a predictive image 116 based on the locally decoded shape information 109. The predictive image 116 created in the motion estimation part 115 is provided to the subtractor 128 and the adder 129.

The subtractor 128 calculates the difference between the predictive image 116 and the input macro block to provide a prediction-error image 117, which is fed to the texture encoding part 118.

The texture encoding part 118 encodes the prediction-error image 117 by a predetermined method prescribed by MPEG-4 to obtain encoded texture information 119 and a locally decoded prediction-error image 120. In this instance, only the objects contained in the block are encoded based on the locally decoded shape information 109. The encoded texture information 119 is provided to the video signal multiplexing part 126. The locally decoded prediction-error image 120 is fed to the adder 129.

The adder 129 adds the predictive image 116 and the locally decoded prediction-error image 120 to create a decoded image 121, which is written in the memory 122.

In the header multiplexing part 124 respective pieces of header information are multiplexed to generate a bit stream 125, which is input into the video signal multiplexing part 126.

The video signal multiplexing part 126 multiplexes the encoded shape information 112, the motion information 114 and the encoded texture information 119 onto the bit stream 125, and outputs an encoded VOP bit stream.

Figure 4:
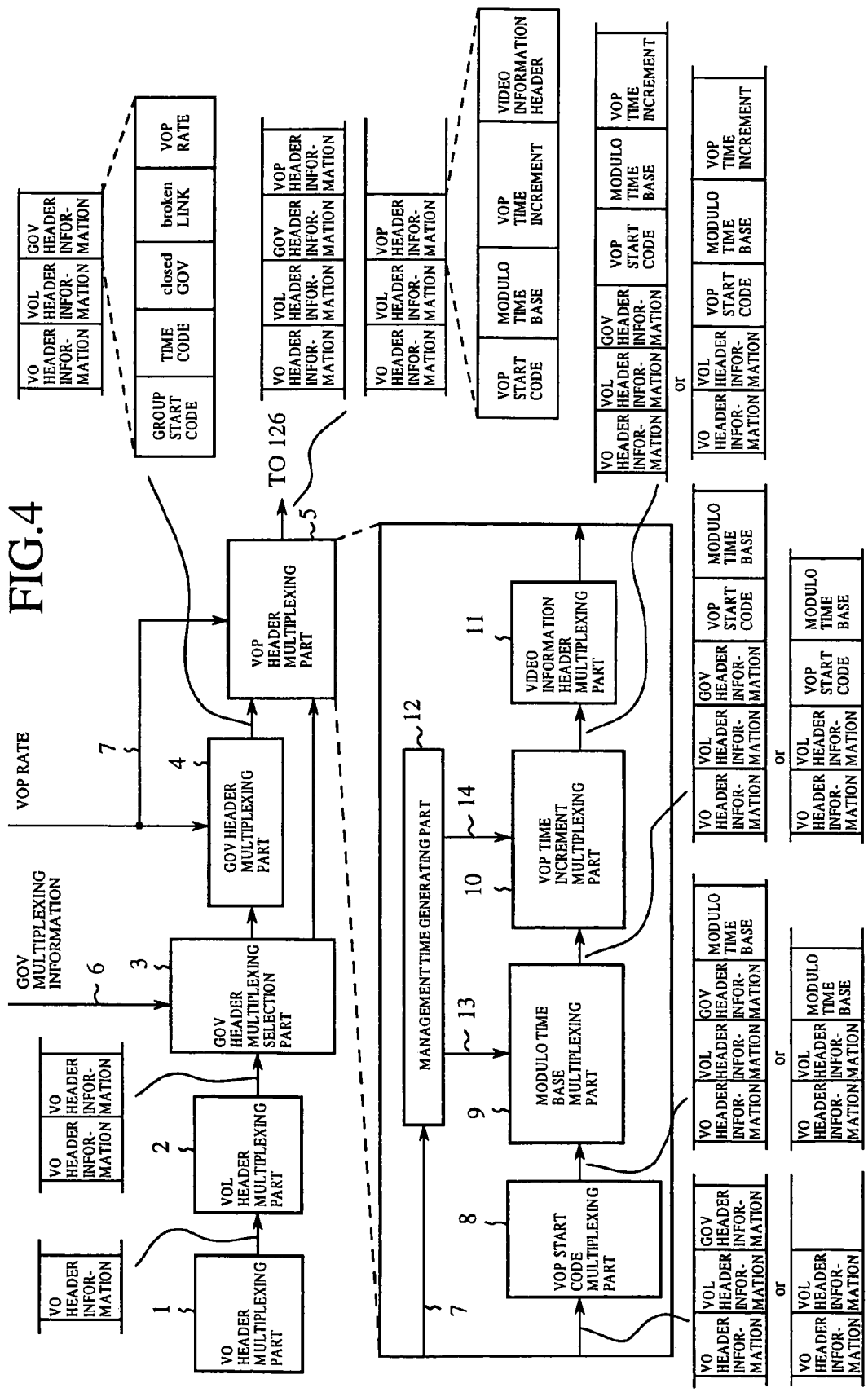
FIG. 4 is a block diagram illustrating an example of the configuration of a header multiplexing part of the VOP encoder part according to the first embodiment.

FIG. 4 is a block diagram depicting the configuration of the header multiplexing part shown in FIG. 3. In FIG. 4, reference numeral 1 denotes a VO header multiplexing part, 2 a VOL header multiplexing part, 3 a GOV header multiplexing selection part, 4 a GOV header multiplexing part, 5 a VOP header multiplexing part, 6 GOV multiplexing information, and 7 the VOP rate.

Next, the operation of the header multiplexing part will be described. The VO header multiplexing part 1 multiplexes VOP header information to creates a bit stream, and outputs it to the VOL header multiplexing part 2. The VOL header multiplexing part 2 multiplexes VOL header information onto the input bit stream, and outputs the multiplexed bit stream to the GOV header multiplexing selection part 3.

The GOV header multiplexing selection part 3 determines the destination of the bit stream fed from the VOL header multiplexing part 2 based on the GOV multiplexing information 6 indicating whether to perform the multiplexing of the GOV header. When the GOV multiplexing information 6 indicates that no multiplexing of the GOV header takes place, the bit stream is output to the VOP header multiplexing part 5. When the GOV multiplexing information 6 indicates that the multiplexing of the GOV header is performed, the bit stream is provided to the GOV header multiplexing part 4.

Table 1 shows, by way of example, four values of the VOP rate 7. When the VOP rate is 30/sec, VOP rate information "01" is multiplexed. When the VOP to be encoded is the same as the VOP encoded immediately previously, VOP information "00" is multiplexed but the subsequent VOP header information and VOP data information are not multiplexed. When the VOP rate is variable, VOP rate information "11" is multiplexed. That is, the VOP rate information indicates whether the VOP rate is fixed or variable, and represents the value of the rate when it is fixed.

A VOP start code multiplexing part 8 in the VOP header multiplexing part 5 outputs to a modulo time base multiplexing part 9 and a VOP time increment multiplexing part 10 a bit stream obtained by multiplexing a VOP start code onto the input bit stream.

Figure 5:
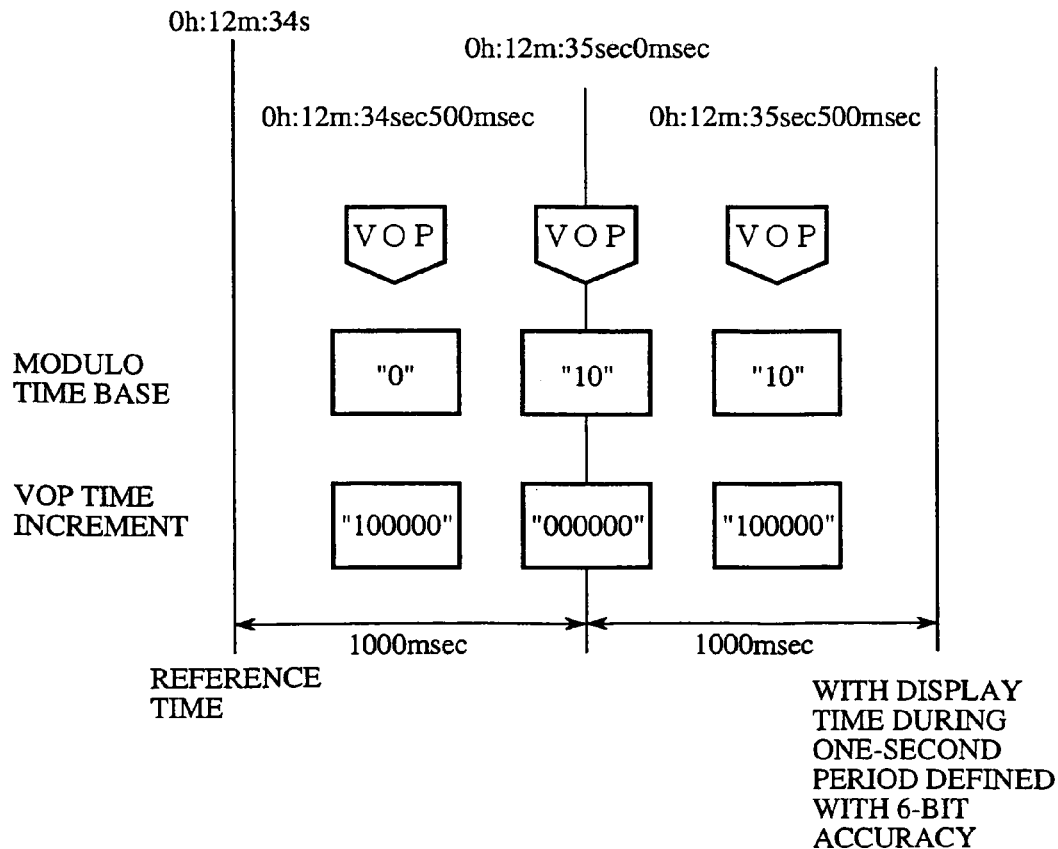
FIG. 5 is a diagram for explaining a modulo time base and a VOP time increment.

The modulo time base 13 mentioned herein is information that represents what number of seconds will pass until the VOP concerned is displayed after a certain reference time as depicted in FIG. 5. The VOP time increment 14 is information that is used to fine-adjust the display time defined by the modulo time base with an accuracy of $1/1000$th of a second also as shown in FIG. 5. That, is, MPEG-4 permits defining the VOP display time with a precision of $1/1000$th of a second.

A management time generating part 12 in the VOP header multiplexing part 5 generates the modulo time base 13 and the VOP time increment 14 based on the VOP rate 7, and outputs the former to the modulo time base multiplexing part 9 and the latter to the VOP time increment multiplexing part 10. When the VOP rate 7 indicates a variable rate, the modulo time base 13 and the VOP time increment 14 are set independently of the VOP rate 7.

The modulo time base multiplexing part 9 multiplexes the modulo time base 13 onto the bit stream provided from the VOP start code multiplexing part, and outputs the multiplexed bit stream to the VOP time increment multiplexing part 10. The VOP time increment multiplexing part 10 multiplexes the VOP time increment 14 fed thereto from the management time generating part 12 onto the bit stream fed from the modulo time base multiplexing part 9, and outputs the multiplexed bit stream to a video information header multiplexing part 11. The video information header multiplexing part 11 multiplexes a video information header onto the bit stream provided thereto from the VOP time increment multiplexing part 10, and outputs the multiplexed bit stream to the video signal multiplexing part 126.

As described above, according to Embodiment 1, since the VOP rate information is multiplexed onto the GOV header, a bit stream can be created which enables the decoder side to determine whether or not to require the decoding of the VOP concerned, or to synthesize a plurality of objects, simply by analyzing only the VOP start code of each VOP header.

Figure 6:
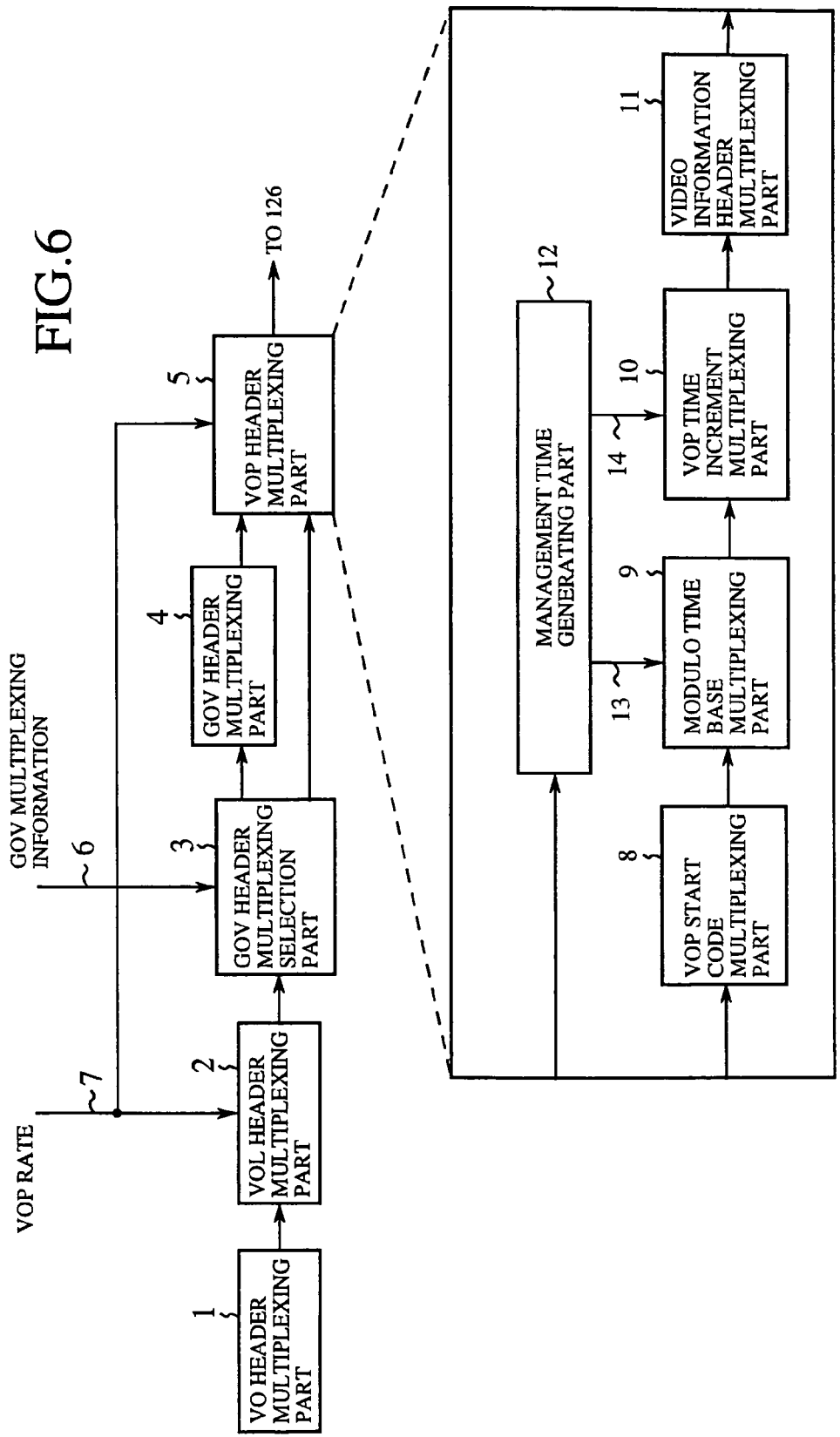
FIG. 6 is a block diagram illustrating another example of the configuration of the header multiplexing part of the VOP encoder part according to first embodiment.

It is also possible to define the VOP rate information for each VOL and perform encoding and multiplexing of the VOP rate 7 as shown in FIG. 6. In this instance, the VOP rate 7 is determined for each VOL and is multiplexed in the VOL header multiplexing part 2. The VOP rate 7 is used to determine the modulo time base 13 and the VOP time increment 14.

As described above, the image encoding device of Embodiment 1, which encodes images object by object, is provided with: encoding means for encoding the images on the basis of predetermined display speed information; and multiplexing means for multiplexing the predetermined display speed information onto the image signals encoded by the encoding means and for outputting the multiplexed signals.

Furthermore, the multiplexing means may also be modified to multiplex the display speed information on an object-by-object basis.

Embodiment 2

A second embodiment (Embodiment 2) of the present invention concerns a modified form of the VOP encoder described above in Embodiment 1. The VOP encoder of Embodiment 2 is provided with means for encoding a 1-bit VOP rate flag that indicates as the display speed information whether the object display speed is fixed or variable and the VOP rate information that indicates the value of the object display speed, and for multiplexing them into the bit stream.

When the VOP rate flag indicates a variable speed, the VOP rate corresponds to "variable" in Table 1 referred to previously in respect of Embodiment 1. When the VOP rate flag indicates a fixed speed, the VOP rate corresponds to 30/sec or 15/sec in Table 1.

Figure 7:
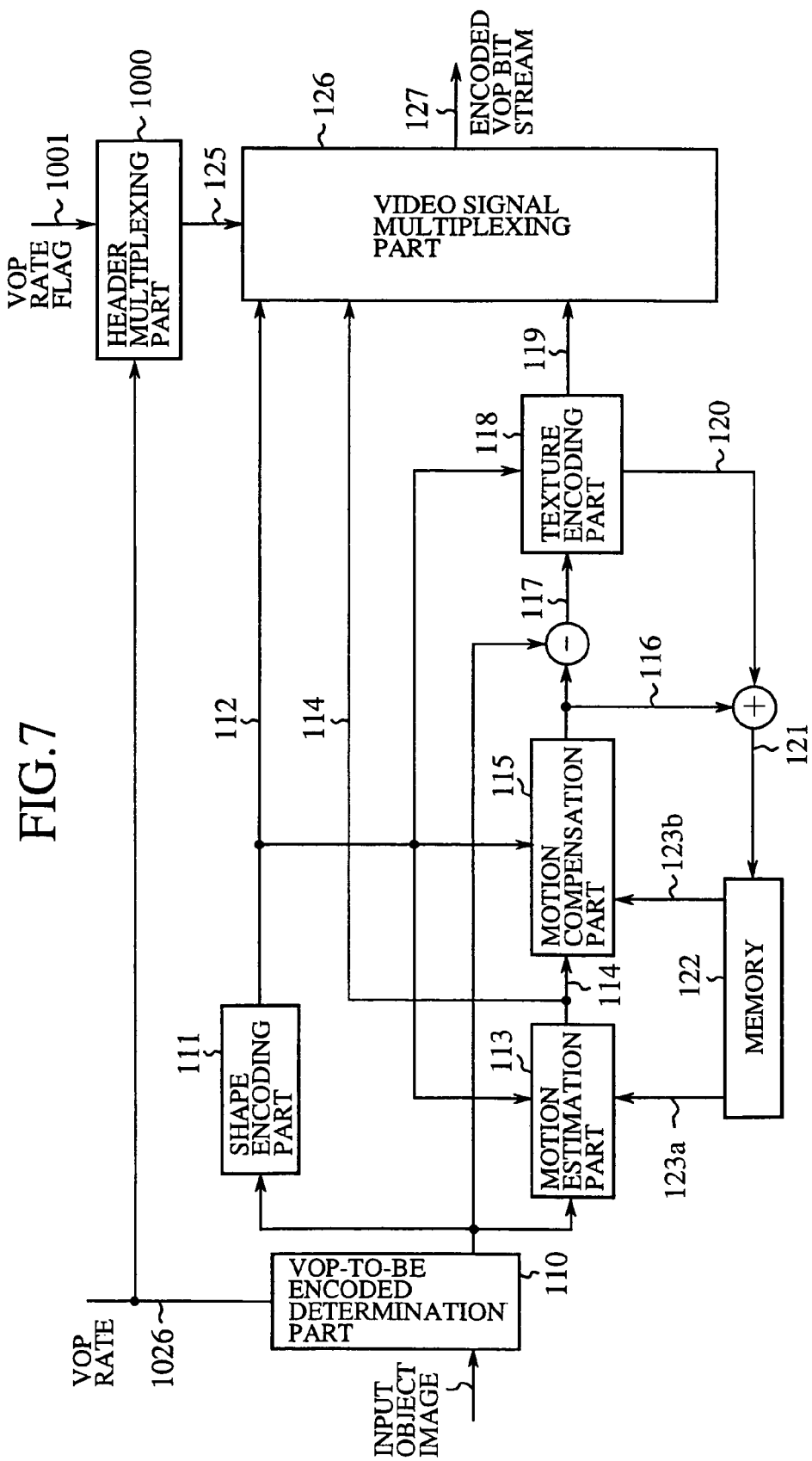
FIG. 7 is a block diagram depicting a VOP encoder part according to a second embodiment of the present invention.

FIG. 7 shows an example of the configuration of the VOP encoder according to Embodiment 2. Reference numeral 1000 denotes a header multiplexing part, 1001 the VOP rate flag, and 1026 the VOP rate. Since the VOP encoder according to this embodiment differs from the VOP encoder of Embodiment 1 only in the configuration and operation of the header multiplexing part 1000 that is the counterpart 124 of the latter, a description will be given in this respect alone.

Figure 8:
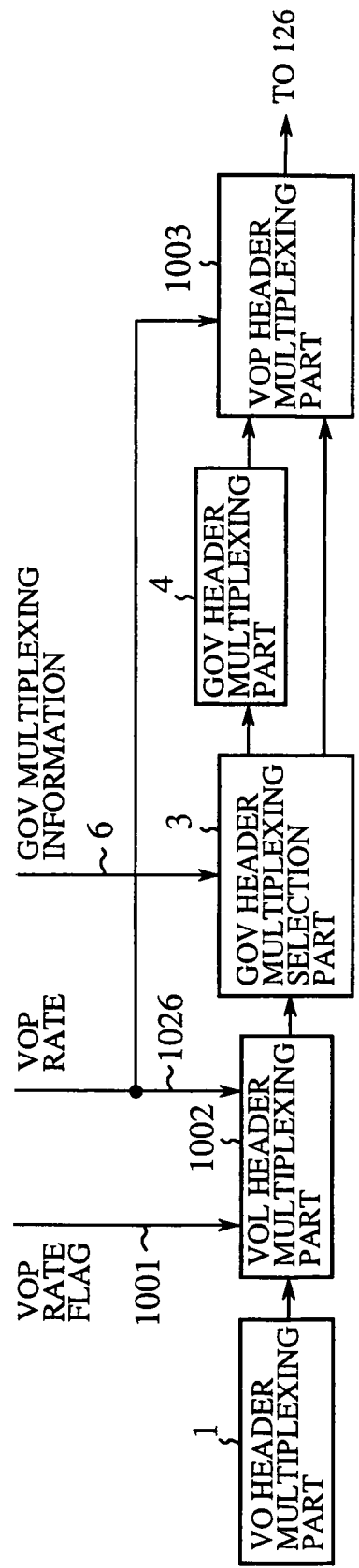
FIG. 8 is a block diagram depicting an example of the configuration of the header multiplexing part of the VOP encoder part according to the second embodiment.

FIG. 8 is a block diagram depicting the configuration of the header multiplexing part 1000 of the VOP encoder according to Embodiment 2. In FIG. 8, reference numeral 1002 denotes a VOL header multiplexing part, and 1003 a VOP header multiplexing part.

Next, the operation of this embodiment will be described.

The VOP header multiplexing part 1 creates a bit stream by multiplexing VO header information, and outputs the thus created bit stream to the VOL header multiplexing part 1002. The VOL header multiplexing part 1002 multiplexes VOL header information onto the input bit stream, and outputs the multiplexed bit stream to the GOV header multiplexing selection part 3. In this case, the VOL rate and the VOP rate flag are also multiplexed.

Table 3 shows examples of multiplexing of the VOP rate 1026. In this instance, when the VOP rate 1026 is 2/sec, "000" is multiplexed as the VOP rate information. When the VOP rate is 5/sec, "010" is multiplexed. When the VOP rate is 25/sec, "001" is multiplexed. When the VOP rate is 30/sec, "011" is multiplexed. For other VOP rates (for example, when the VOP rate is 10/sec), "100" is multiplexed. Incidentally, a decision as to whether to multiplex the VOP rate information is made independently of the VOP flag value described later on. The multiplexing of the VOP rate may also be done as exemplified in Table 4. In this case, when all VOPs are related to exactly the same image in the VOL, the image is regarded as a still picture and "010" is multiplexed as the VOP rate information.

Figure 9:
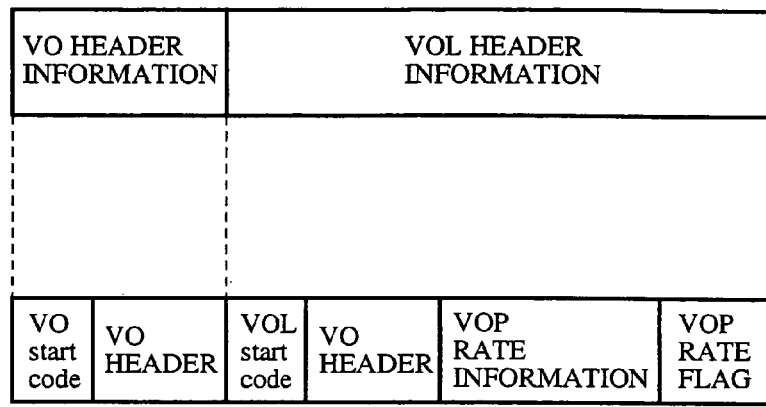
FIG. 9 is a diagram showing an example of a bit stream.

Depending on whether the VOP rate flag indicates a fixed or variable speed, "1" or "0" is multiplexed. FIG. 9 depicts an example of the bit stream provided from the VOL header multiplexing part 1002.

The GOV header multiplexing selection part 3 determines the destination of the bit stream fed thereto from the VOL header multiplexing part 102 based on the GOV multiplexing information 6 indicating whether to multiplex the GOV header. When the GOV multiplexing information 6 does not indicates the multiplexing of the GOV header, the bit stream is provided to the VOP header multiplexing part 1003. When the GOV multiplexing information 6 indicates the multiplexing of the GOV header, the bit stream is provided to the GOV header multiplexing part 4.

Figure 10:
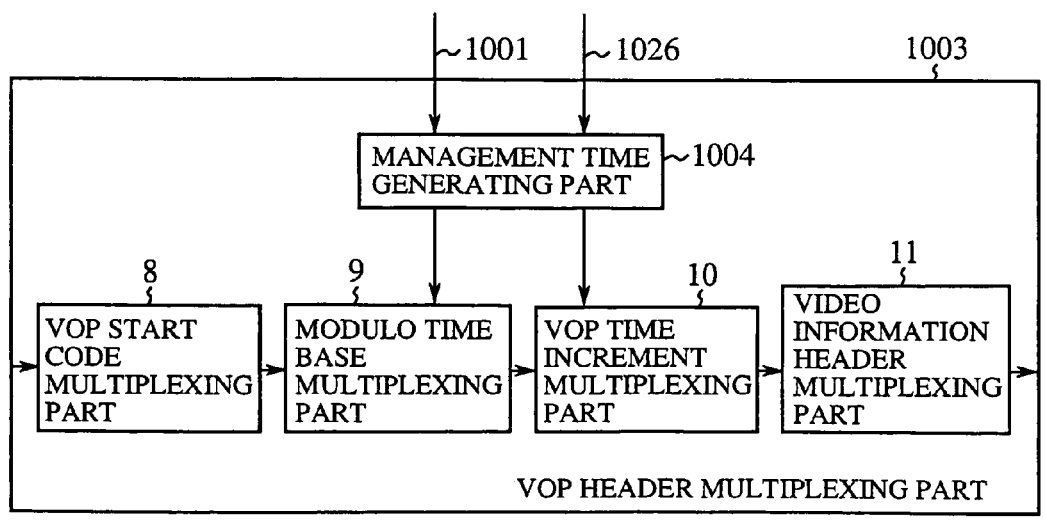
FIG. 10 is block diagram showing an example of the configuration of a VOP header multiplexing part of the header multiplexing part in the second embodiment.

The GOV header multiplexing part 4 multiplexes the GOV header information onto the input bit stream, and outputs the multiplexed bit stream to the VOP header multiplexing part 1003. FIG. 10 illustrates the VOP header multiplexing part 1003 in detail. Reference numeral 1004 denotes a management time generating part.

Next, the operation of the GOV header multiplexing part 4 will be described. The management time generating part 1004 generates a modulo time base and a VOP time increment based on the VOP rate 1026 when the input VOP rate flag 1001 indicates a fixed speed, and based on a timer contained in the VOP encoder when the input VOP rate flag 1001 indicates a variable speed. The modulo time base and the VOP time increment thus created are provided to the modulo time base multiplexing part 9 and the VOP time increment multiplexing part 10, respectively.

The VOP time increment multiplexing part 10 multiplexes the VOP time increment onto the input bit stream, and outputs the multiplexed bit stream to the video information header multiplexing part 11. The video information header multiplexing part 11 multiplexes the video information header onto the bit stream provided thereto from the VOP time increment multiplexing part 10, and outputs the multiplexed bit stream to the vide signal multiplexing part 126.

As described above, according to Embodiment 2, since the VOP rate flag and the VOP rate information are multiplexed onto the VOL layer, a bit stream can be created which enables the user to specify his desired VOP in a moment through utilization of the VOP rate flag and the VOP rate on the decoder side—this allows him to determine whether or not to require the decoding of the VOP concerned, or to synthesize a plurality of objects, simply by analyzing only the VOP start code of the corresponding VOP header.

Incidentally, since it is possible to distinguish between variable and fixed speeds even if only the VOP rate flag is multiplexed, the VOP desired to decode can be decoded.

As described above, the image encoding device according to Embodiment 2, which encodes images on an objectwise basis, is provided with: means for encoding the flag indicating whether the object display speed is fixed or variable; multiplexing means for multiplexing the flag onto the encoded image signal encoded by the encoding means and for outputting the multiplexed signal; encoding means for encoding the images on the basis of predetermined display speed information; and multiplexing means for multiplexing the predetermined display speed information onto the image signals encoded by the encoding means and for outputting the multiplexed signals.

Embodiment 3

A third embodiment (Embodiment 3) of the present invention is directed to an image decoding device for decoding from an encoded bit stream the VOP rate information mentioned previously in connection with Embodiment 1, that is, an MPEG-4 video decoder (hereinafter referred to as a VOP decoder). The image decoding device of this embodiment is applicable to a system which employs such decoding devices in one-to-one correspondence to a plurality of objects and synthesizes decoded objects to reconstruct a pictorial image.

A description will be given first of the configuration and operation of the image decoding device (VOP decoder) of Embodiment 3. Since the operation of the existing VOP decoder is disclosed, for example, in ISO/IEC JTC1/SC29/WG11/N1796, the VOP decoder of a novel configuration according to this embodiment will be described without referring to the existing VOP decoder itself. The VOP decoder of this embodiment is one that is able to decode the encoded bit stream generated by the VOP encoder described previously with reference to Embodiment 1.

Figure 11:
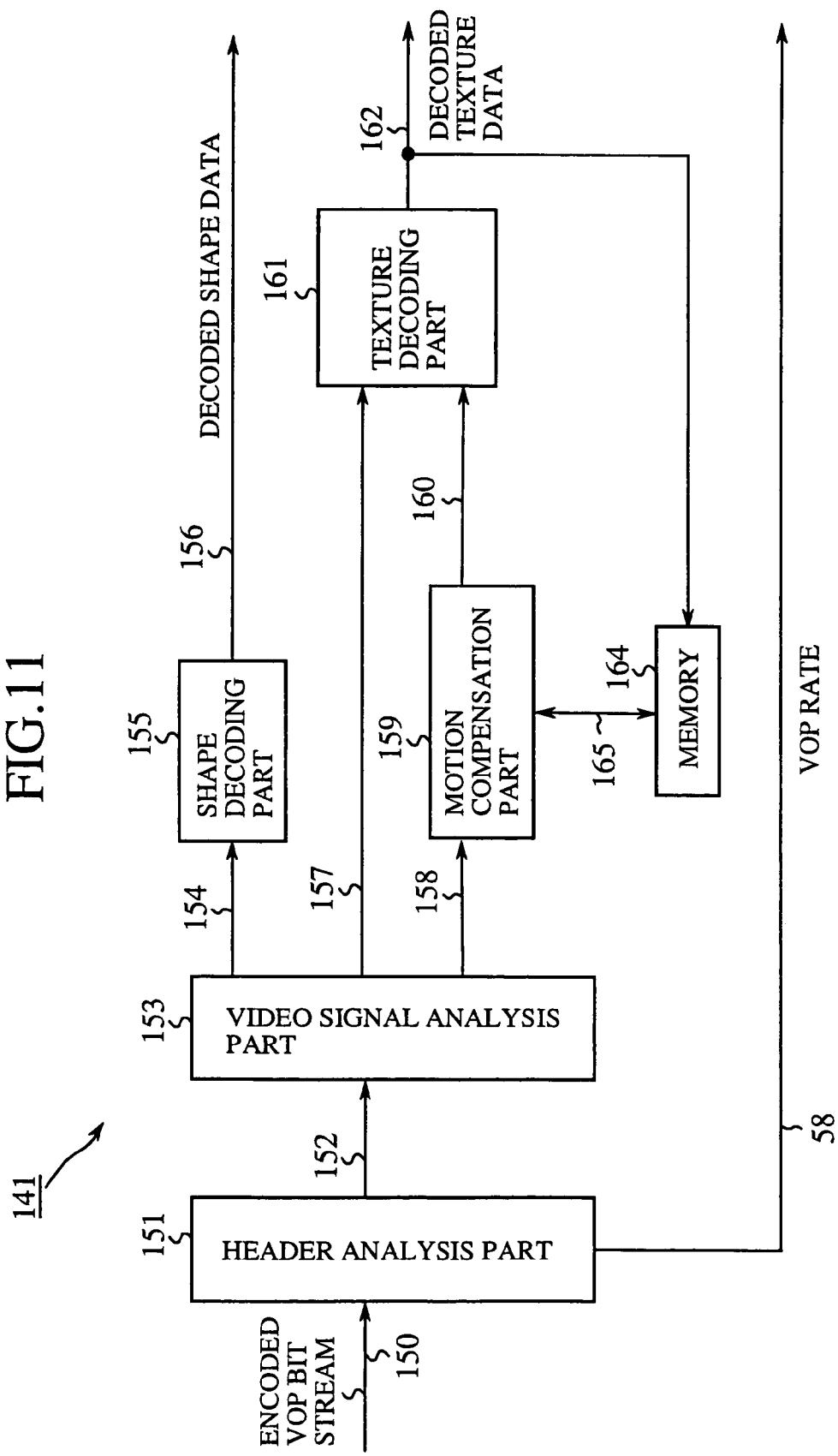
FIG. 11 is a block diagram depicting the internal configuration of a VOP decoder part according to a third embodiment of the present invention.

FIG. 11 depicts an example of the internal configuration of the VOP decoder according to Embodiment 3. The VOP decoder is supplied with compressed-encoded data composed of texture data and shape data as described previously with reference to Embodiment 1 and shown in FIG. 2, and decodes the individual pieces of data. In FIG. 11, reference numeral 150 denotes encoded VOP bit stream, 151 a header analysis part, 152 a bit stream with the header information analyzed, 153 a video signal analysis part, 154 encoded shape data, 155 a shape decoding part, 156 decoded shape data, 157 encoded texture data, 158 motion information, 159 a motion compensation part, 160 predictive texture data, 161 a texture decoding part, 162 decoded texture data, 164 a memory, and 165 reference data.

Referring to FIG. 11, the operation of the decoder will be described in detail. The encoded VOP bit stream 150 is input into the header analysis part 151, wherein the header information is analyzed following a predetermined syntax. The bit stream having the header information analyzed in the header analysis part 151 is fed into the video signal analysis part 153, wherein it is analyzed into the encoded shape data 154, the encoded texture data 157 and the motion information 158. The shape decoding part 155 decodes the encoded shape data input thereinto, and outputs the decoded shape data 156.

The motion compensation part 159 generates the predictive texture data 160 from the reference data 165 read out of the memory 164 and the motion information 158 provided from the video signal analysis part 153, and provides the predictive texture data 160 to the texture decoding part 161. Based on the encoded texture data 157 and the predictive texture data 160, the texture decoding part 161 reconstructs image data by the method prescribed in MPEG-4, generating the decoded texture data 162. The decoded texture data 162 is written in the memory 164 so that it is used afterward for VOP decoding.

Figure 12:
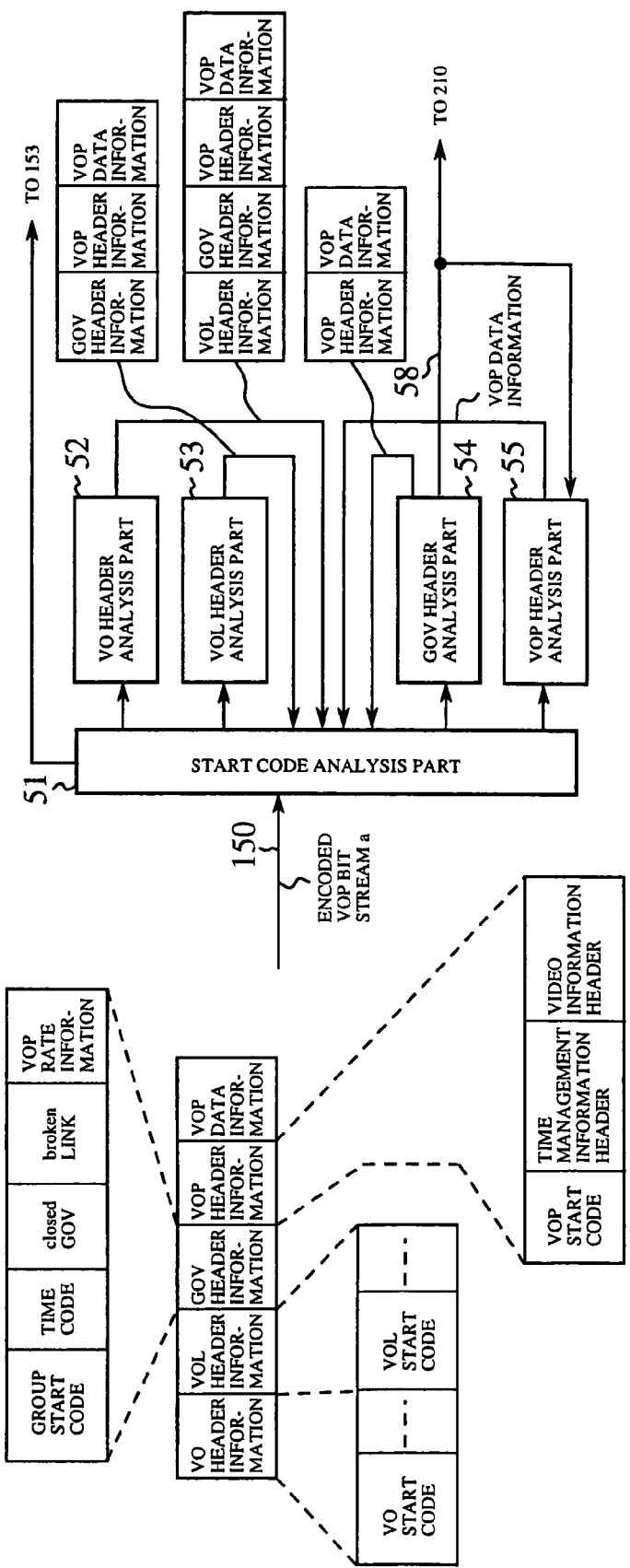
FIG. 12 is a block diagram depicting an example of the configuration of a header analysis part of the VOP decoder part according to the third embodiment.

FIG. 12 depicts the internal configuration of the header analysis part 151 characteristic of Embodiment 3. In FIG. 12, reference numeral 51 denotes a start code analysis part, 52 a VO header analysis part, 53 a VOL header analysis part, 54 a GOV header analysis part, 58 VOP rate information, and 55 a VOP header analysis part. The header analysis part 151 in Embodiment 3 is characterized in that the GOV header analysis part 54 decodes the VOP rate information of VOP contained in the GOV concerned from the bit stream and provides it to the outside. A description will be given later of how to use the VOP rate information 58.

The start code analysis part 51 analyzes the start code contained in the encoded VOP bit stream 150 input thereinto. The start code analysis part 51 outputs the bit stream to the VO header analysis part when the analyzed start code is indicative of VOL, to the VOL header analysis part 53 when the start code is indicative of VOL, to the GOV header analysis part 54 when the start code is indicative of GOV, and to the VOP header analysis part 55 when the start code is indicative of VOP. Incidentally, upon completion of the analysis in the VOP header analysis part 55, the bit stream is output to the video signal analysis part 153.

The VO header analysis part 52 analyzes VO header information from the input bit stream, and outputs the analyzed bit stream to the start code analysis part 51. The VOL header analysis part 53 analyzes VOL header information from the input bit stream, and outputs the bit stream to the start code analysis part 51. The GOV header analysis part 54 analyzes GOV header information from the input bit stream, and outputs the bit stream to the start code analysis part 51. At this time, the VOP rate information 58 contained in the GOV header information is decoded and output. The VOP header analysis part 55 analyzes VOP header information from the input bit stream, and outputs the bit stream via the start code analysis part 51 to the video signal analysis part 153.

Figure 13:
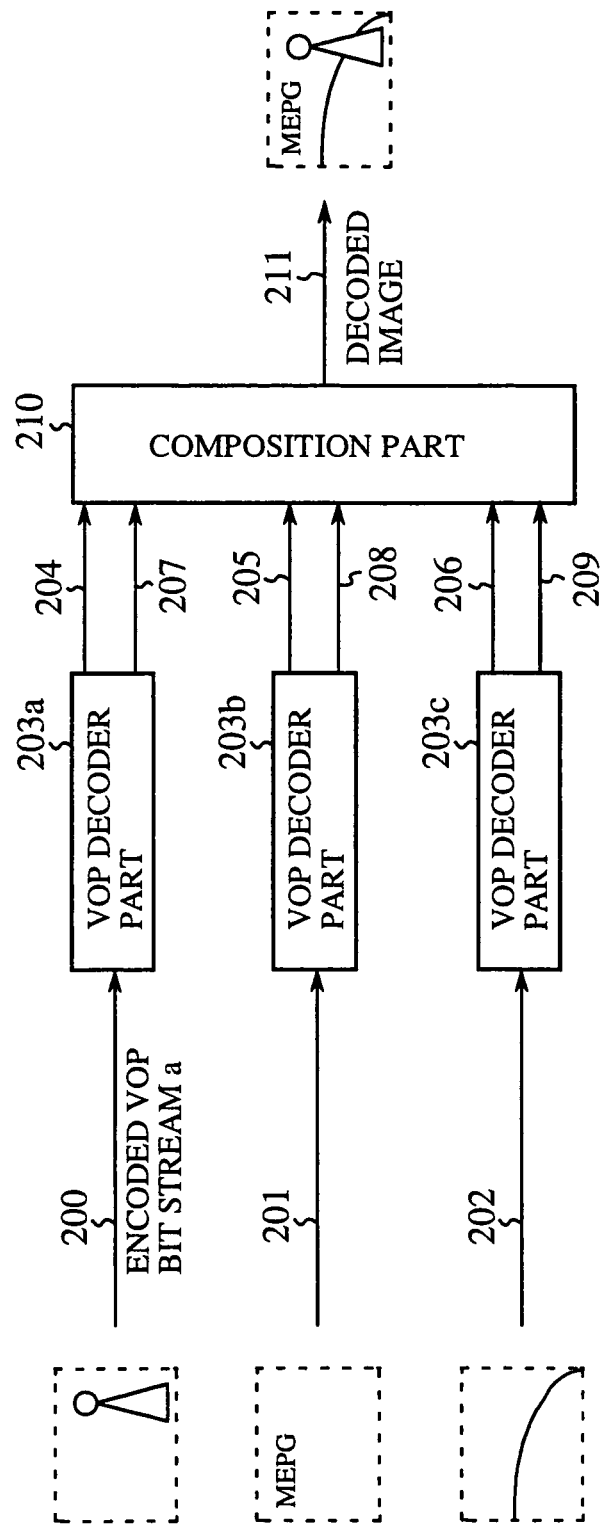
FIG. 13 is a block diagram depicting a system for synthesizing a plurality of objects according to the third embodiment.

With the VOP decoder of the above configuration and operation, it is possible to output, for each GOV, the VOP rate information of VOPs contained therein. FIG. 13 illustrates a system that uses this information to synthesize a plurality of objects. In FIG. 13, reference numeral 200 denotes an encoded VOP bit stream a, 201 an encoded VOP bit stream b, 202 an encoded VOP bit stream c, 203a a VOP decoder for decoding the encoded VOP bit stream a200, 203b a VOP decoder for decoding the encoded VOP bit stream b201, 203c a VOP decoder for decoding the encoded bit stream c202, 204 a decoded object image a, 205 a decoded object image b, 206 a decoded object image c, 207 VOP rate information a, 208 VOP rate information b, 209 VOP rate information c, 210 a composition part, and 211 a decoded pictorial image. The decoded object image herein mentioned refers to an image that is obtained by combining the decoded shape data 154 and the corresponding decoded texture data 162 for each of VOPs and then integrating such combined pieces of data for each group of VOPs (for example, GOV or VOL).

The encoded VOP bit streams a200 to c202 are decoded by the VOP decoder 203a to 203c corresponding thereto, respectively, by which the decoded VOP images a204 to c206 are generated. At this time, the VOP decoder decode the corresponding VOP rate information a207 to c209, and output them to the composition part 210. Based on the VOP rate information a207 to c209, the composition part 210 determines the times of the frames of the pictorial image 211 in which to synthesize the decoded VOP images, and maps them into the frames corresponding to the determined times. Let it be assumed, for example, that the decoded image 211 is displayed at a rate of 30 video object planes per sec (which corresponds to a ordinary TV signal display speed). Furthermore, assume the following situations.

The decoded VOP image a204 is displayed at a rate of 5/sec (that is, the VOP rate information a207 indicates the 5/sec rate).

The decoded VOP image b205 is displayed at a rate of 10/sec (that is, the VOP rate information indicates the 10/sec rate).

The decoded VOP image c206 is displayed at a rate of 15/sec (that is, the VOP rate information c209 indicates the 15/sec rate).

In this instance, the decoded VOP images a204 to c206 are all mapped into the first image frame at each second in the decoded image 211; the decoded VOP image a204 is mapped into every five image frames including the first at each second; the decoded VOP image b205 is mapped into every 10 image frames including the first at each second; and the decoded VOP image c206 is mapped into every 15 images frames including the first at each second. By this, it is possible to display a pictorial image with a plurality of objects synthesized in the image frames in accordance with their display speeds.

With the use of VOP decoders each of which decodes the encoded bit stream having the VOP rate information encoded in the GOV layer as described above, it is feasible to implement a simple-structured system which synthesizes a plurality of object into a reconstructed image.

The VOP rate information may also be encoded for each VOL at the image encoding device side. In this case, it is possible, at the image decoding device side, to decode the VOP rate encoded for each VOL and synthesize a plurality of objects for each VOL as described above.

While in the above the VOP decoders have been described to be used in a system for synthesizing a plurality of objects, it is also feasible to use only one VOP decoder for a system that decodes only one object to reconstruct an image.

As described above, according to Embodiment 3, the image decoding device which decodes the bit stream encoded from an image on an object-by-object basis is provided with: display speed information decoding means for decoding display speed information from the encoded bit stream; and control means for controlling the reconstruction of the image encoded on the object-by-object basis through utilization of the display speed information decoded by the display speed information decoding means. In Embodiment 3 the display speed information decoding means has been described to decode the display speed information object by object.

Embodiment 4

A fourth embodiment (Embodiment 4) of the present invention is directed to a modified form of the VOP decoder of Embodiment 3. The VOP decoder according to this embodiment has a function of specifying the VOP to be decoded on the basis of the value of the VOP rate that the decoder assumes.

Since the VOP decoder of Embodiment 4 differs from that of Embodiment 3 only in the configuration and operation of the header analysis part 151, a description will be given only in this respect.

Figure 14:
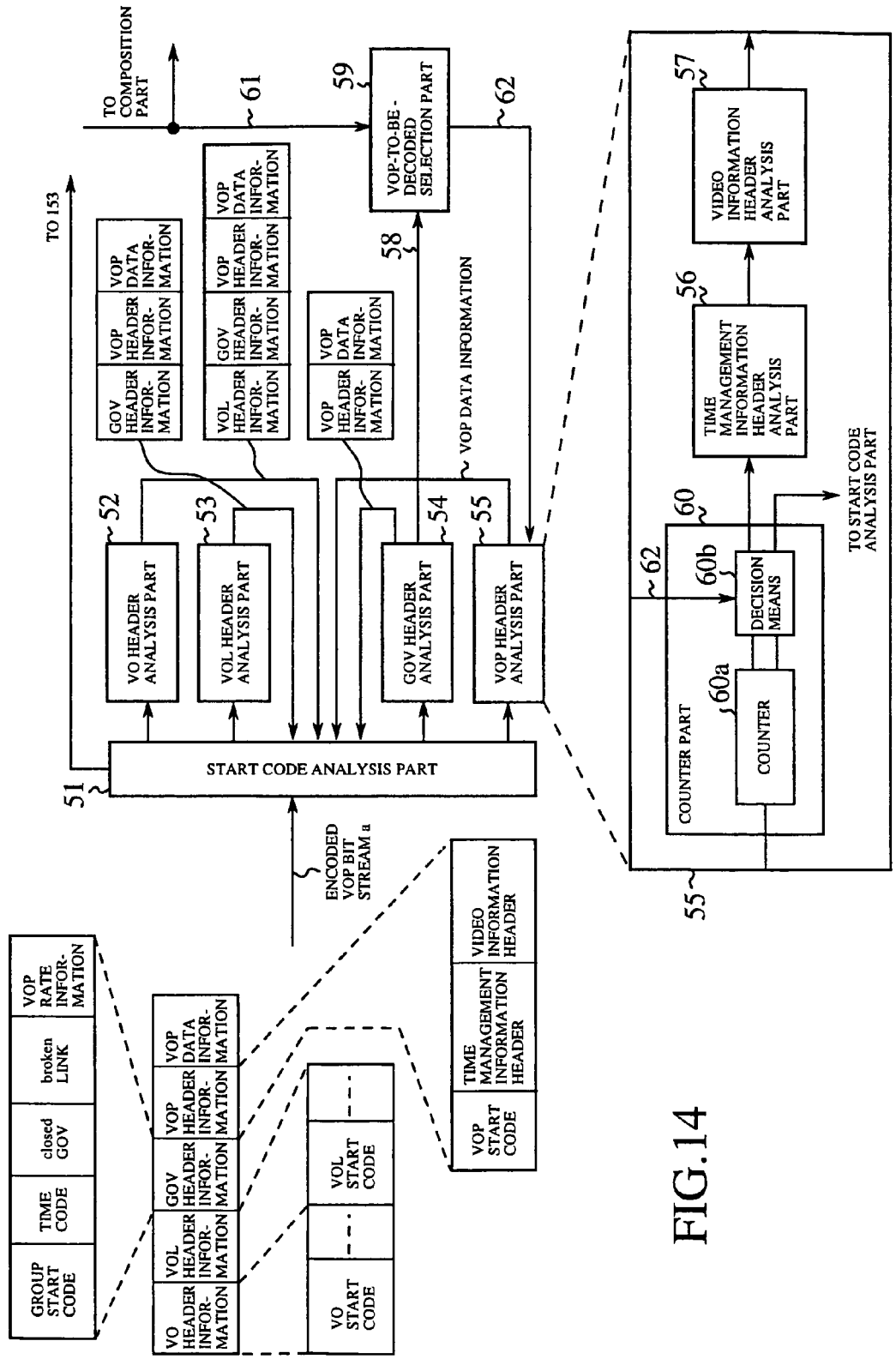
FIG. 14 is a block diagram illustrating an example of the configuration of a header analysis part of a VOP decoder part according to a fourth embodiment of the present invention.
Figure 15:
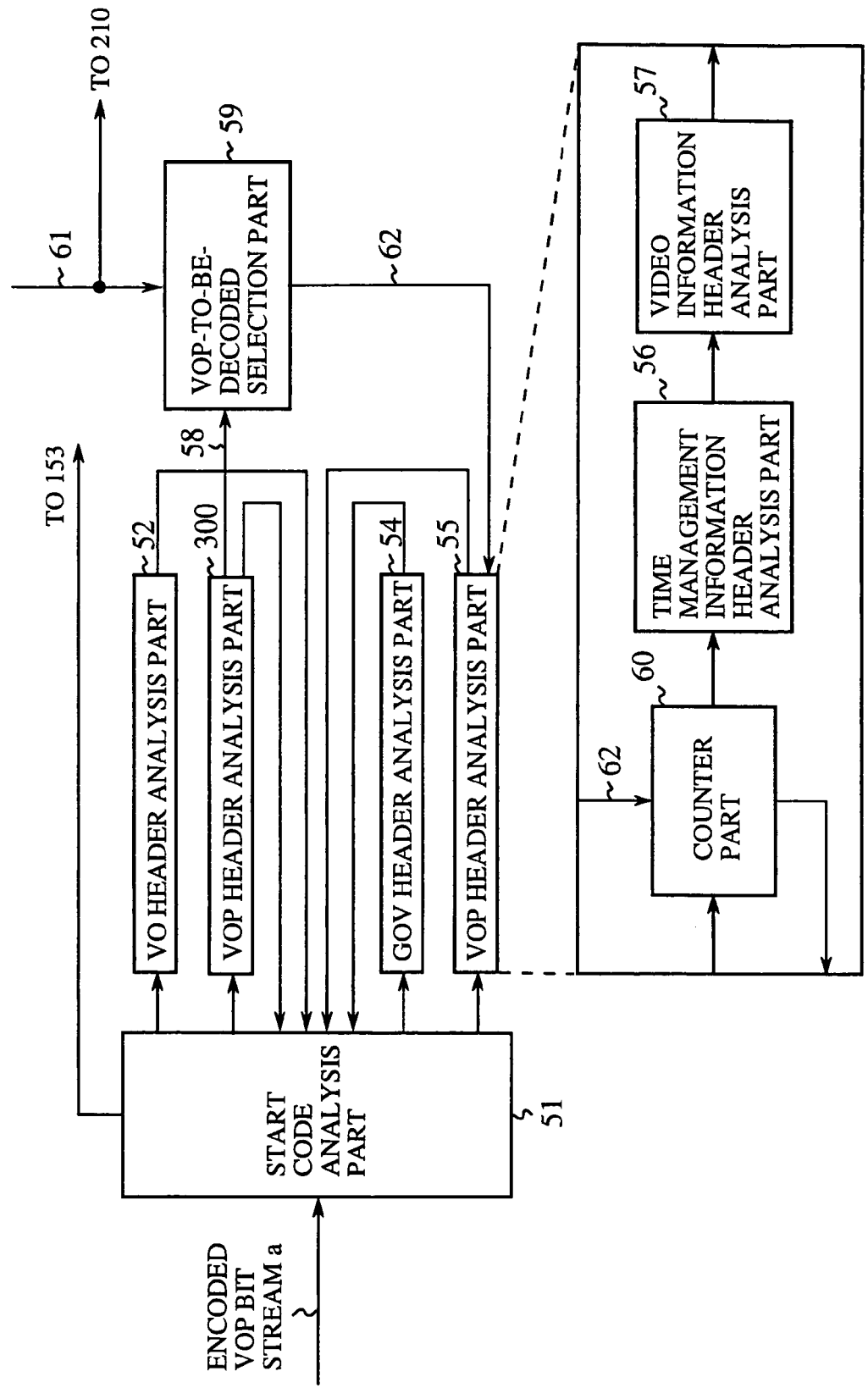
FIG. 15 is a block diagram illustrating another example of the configuration of the header analysis part of the VOP decoder part according to the fourth embodiment.

FIG. 14 is a block diagram illustrating the configuration of the header analysis part of the VOP decoder according to Embodiment 4, in which the VOP rate at the encoder side and the VOP rate at the decoder side do not match. In FIG. 14, reference numeral 59 denotes a VOP-to-be-decoded selection part, which compares a VOP rate from the GOV header analysis part 54 and a VOP rate assumed at the decoder side, and outputs VOP select information 62. And the VOP header analysis part 55 has a counter 60 in addition to a time management information header analysis part 56 and a video information header analysis part 57.

Next, the operation of this embodiment will be described. The VOP-to-be-decoded selection part 59 outputs to the counter part 60 of the VOP header analysis part 55 the VOP select information that indicates information about the VOP to be decoded according to the result of comparison between the VOP rate 58 analyzed in the GOV header analysis part 54 and the VOP rate 61 assumed at the decoder side. The counter part 60 uses the VOP select information 62 to determine whether to decode the VOP header information that follows the VOP start code contained in the input bit stream.

More specifically, when the VOP rate 58 analyzed in the GOV header analysis part 55 is 30/sec and the VOP rate assumed at the decoder side is 15/sec, the VOP select information 62 indicating that every other VOPs are analyzed is provided to the counter part 60 in the VOP header analysis part 55. The counter part 60 first counts every VOP header input thereinto by a counter 60a.

Then, based on the count value input thereinto from the counter 60a and the VOP rate select information 62 from the VOP-to-be-decoded selection part 59, decision means 60b decides whether the input VOP needs to be analyzed. When the input VOP is decided to be analyzed, the input bit stream is output to the time management information header analysis part 56. When the input VOP is decided not be analyzed, the input bit stream is fed to the start code analysis part 51.

To be more specific, when the VOP rate select information 62 is information that one VOP needs to be analyzed for every three VOPs, the decision means 60b judges that the VOP must be analyzed for which the count value from the counter 60a can be divided by 3 without a remainder, and that the VOP need not be analyzed for which the count value from the counter 60a is divided by 3, with a remainder of 1 or 2.

While the VOP decoder of Embodiment 4 has been described to be adapted for use in the case where the VOP rate information is contained in the GOV header, the VOP rate information may also be contained in the VOL header as described previously with reference to Embodiment 2. In such an instance, the VOL header analysis part 300 needs only to be equipped with the function of decoding the VOP rate information 58.

Moreover, the VOP decoder of this embodiment can be used not only in a system which synthesizes a plurality of objects but also in a system which decodes and reconstructs only one object.

As described above, the decoder according to Embodiment 4 has, as control means, decoding time specifying means for specifying the time when to decode an object on the basis of the object display information decoded by the display speed information decoding means and the object display speed information preset in the decoding device; and decoding means for decoding the object at the decoding time specified by the decoding time specifying means.

Embodiment 5

A fifth embodiment (Embodiment 5) of the present invention is directed to a modified form of the VOP decoder Embodiment 3 or 4. The VOP decoder according to this embodiment is equipped with a function of specifying a VOP to be decoded on the basis of the VOP rate flag indicating whether the object display speed is fixed or variable; the VOP rate information indicting the object display speed; externally-set display control information indicating time information externally set by a user; and a time code.

Figure 16:
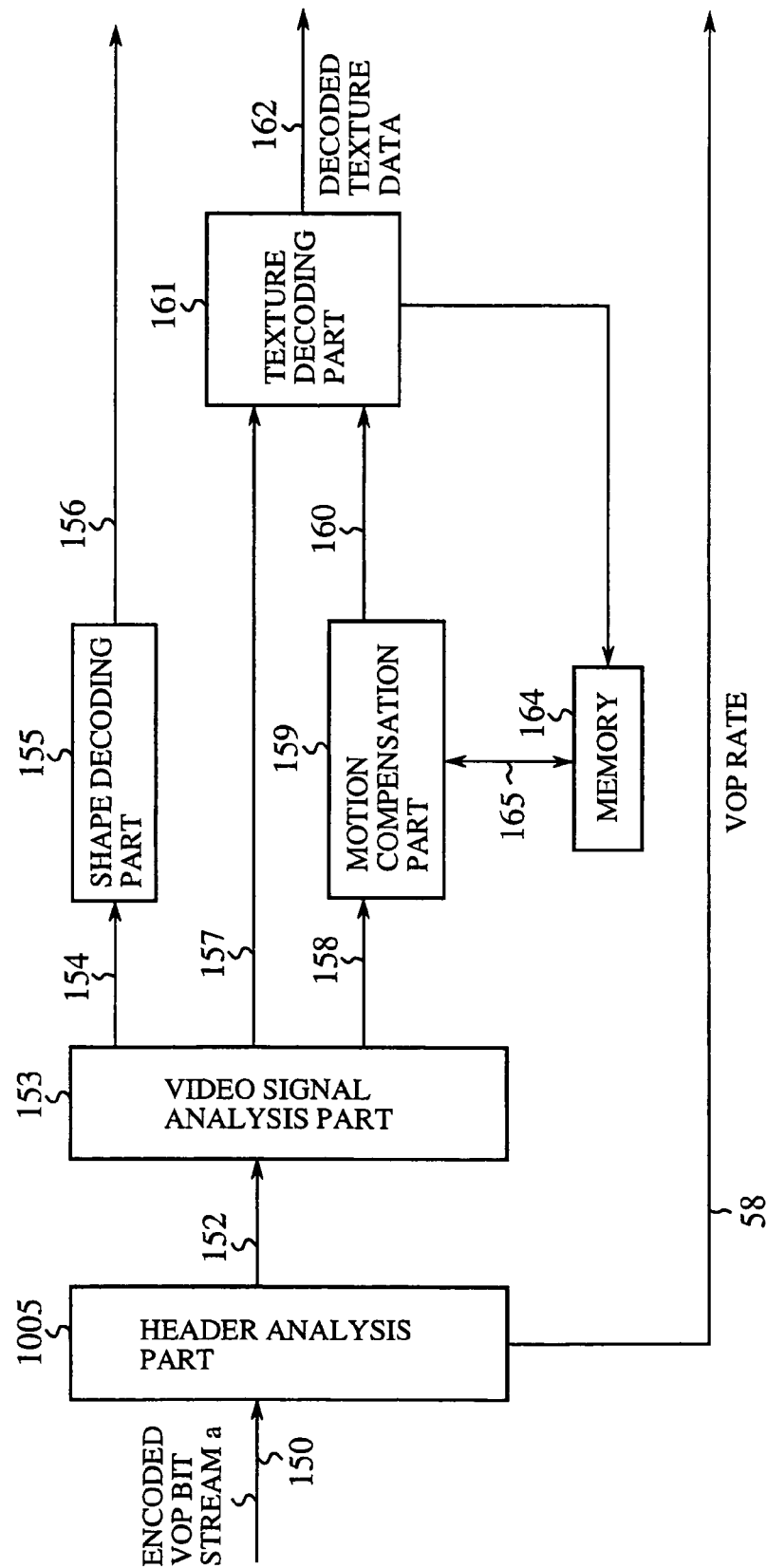
FIG. 16 is a block diagram showing the internal configuration of a VOP decoder part according to a fifth embodiment of the present invention.

Since the VOP decoder of Embodiment 5 differs, as shown in FIG. 16, from the VOP decoder of Embodiment 3 only in the configuration and operation of a header analysis part 1005 corresponding to the header analysis part 151 of the VOP decoder of the latter, a description will be given in this respect alone.

Figure 17:
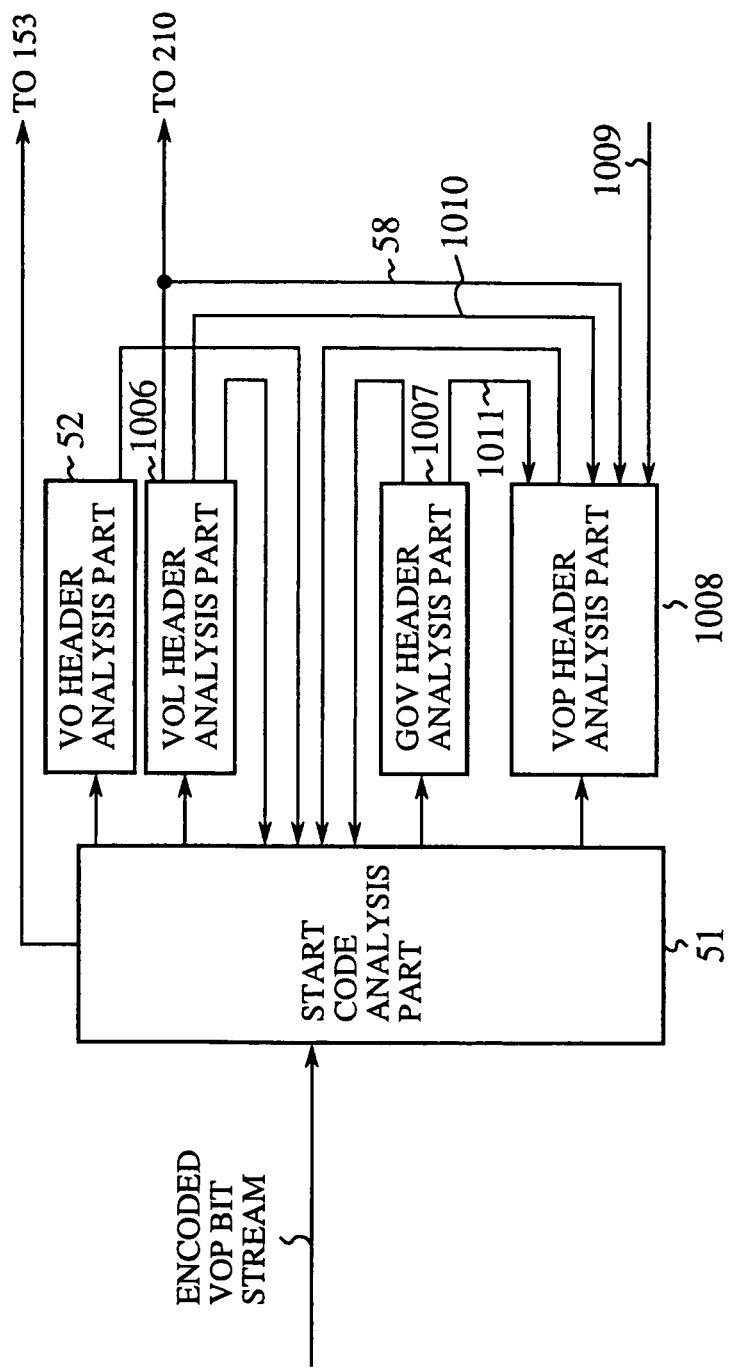
FIG. 17 is a block diagram illustrating an example of the configuration of a header analysis part of the VOP decoder part according to the fifth embodiment.

FIG. 17 is a block diagram illustrating the configuration of the header analysis part 1005 of the VOP decoder according to this embodiment. Reference numeral 1006 denotes a VOL header analysis part, 1007 a GOV header analysis part, 1008 a VOP header analysis part, 1009 an externally-set display control information, 1010 a VOP rate flag, and 1011 a time code. Incidentally, the externally-set display control information 1009 may be information indicating absolute time or VOP select information indicating the number of VOPs from which one VOP to be decoded is selected.

Next, the operation of this embodiment will be described. The start code analysis part 51 analyzes the start code contained in the input encoded VOP bit stream. The start code analysis part outputs the bit stream to the VO header analysis part 52 when the analyzed start code indicates VO, to the VOL header analysis part 1006 when the start code indicates VOL, to the GOV header analysis part 1077 when the start code indicates GOV, and to the VOP header analysis part 1008 when the start code indicates VOP. The bit stream is provided to the video signal analysis part 153 after completion of the analysis in the VOP header analysis part 1008.

Next, the VO header analysis part 52 analyzes the VO header, the VOP rate information 58 and the VOP rate flag 1011 contained in the input bit stream, and outputs the analyzed bit stream to the start code analysis part 51 and, at the same time, outputs the VOP rate information 58 to the composition part 210 and the VOP header analysis part 1008 and the VOP rate flag 1010 to the VOP header analysis part 1008.

The GOV header analysis 1007 analyzes the GOV header contained in the input bit stream, and outputs the analyzed bit stream to the start code analysis part 51 and, at the same time, outputs the time code 1011 contained in the analyzed GOV header to the VOP header analysis part 1008.

Figure 18:
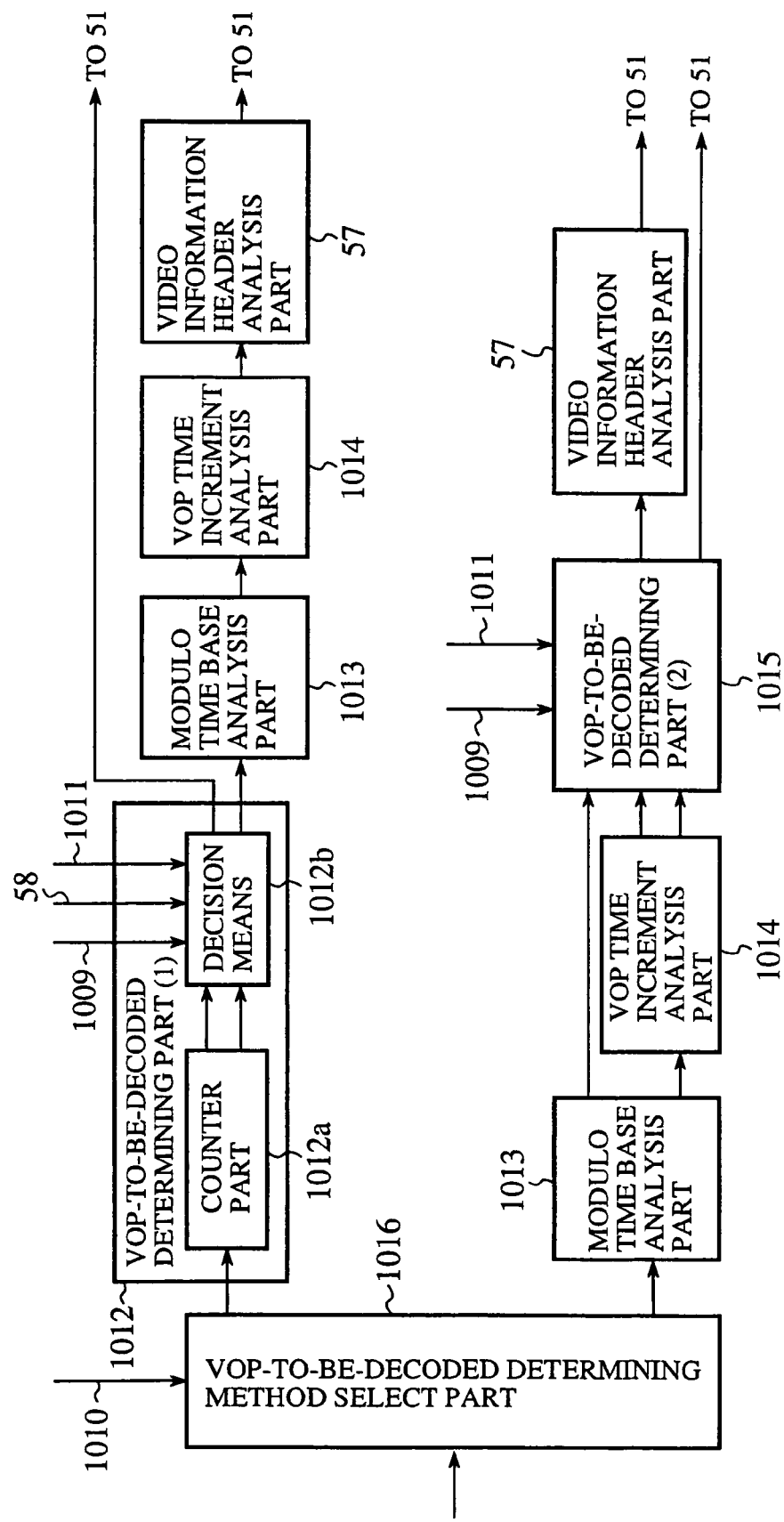
FIG. 18 is a block diagram illustrating an example of the configuration of a VOP header analysis part of the VOP decoder part according to the fifth embodiment.

FIG. 18 is a block diagram illustrating the VOP header analysis part 1008 in detail. Reference numeral 1012 denotes a VOP-to-be-decoded determining part (1), which has a counter part 1012a and decision means 1012b. Reference numeral 1013 denotes a modulo time base analysis part, 1014 a VOP time increment analysis part, 1015 a VOP-to-be-decoded determining part (2), and 1016 a VOP-to-be-decoded determining method select part.

Next, the operation of the VOP header analysis part 1008 will be described. The VOP-to-be-decoded determining method select part 1016 uses the VOP rate flag 1010 to determine the destination of the input bit stream. When the VOP rate flag 1010 indicates a fixed speed, the VOP-to-be-decoded determining part (1) 1012 is selected as the destination of the bit stream, and when the VOP rate flag 1010 indicates a variable speed, the modulo time base analysis part 1013 is selected.

A description will be given first of the case where the VOP rate flag 1010 indicates a fixed speed. The counter part 1012a in the VOP-to-be-decoded determining part (1) 1012 increments its count value upon each input of the bit stream into the VOP header analysis part 1006 when the VOP start code is detected in the start code analysis part 51, and outputs the count value and the bit stream to the decision means 1012b.

Then the decision means 1012b decides whether the VOP to be decoded needs to be decoded. The operation of the decision means 1012b will be described below in respect of first and second cases where the externally-set display control information 1009 is provided as absolute time and where the externally-set display control information 1009 is provided as VOP select information.

(First Case)

Based on the count value and the VOP rate information fed thereto from the counter part 1012a and the time code 1011, the decision means 1012b calculates the absolute time that the VOP candidate for decoding has. For example, in the case where the count value is 4, the VOP rate is 2/sec and the absolute time is 0 h10 m0 sec0 msec, the absolute of the VOP candidate for decoding has is calculated to be 0 h10 m02 sec0 msec. If the thus calculated absolute time of the VOP candidate for decoding and the externally-set display control information 1009 are equal to each other, the VOP is decided to be decoded.

On the other hand, when they are not equal, the absolute time of the next VOP candidate for decoding is calculated. This is intended to make comparison between the absolute time of the next VOP candidate for decoding and the absolute time of the current VOP candidate so as to ensure decoding of the VOP of the absolute value closer to the externally-set display control information 1009. The absolute time of the next VOP candidate for decoding is calculated from the already calculated absolute time of the current VOP candidate and the VOP rate information 58. When this calculated value is smaller or equal to the externally-set display control information 1009, the next VOP candidate is decided to be decoded, and the current VOP candidate is not decoded. When the calculated value exceeds the externally-set display control information 1009, any of the following methods may be chosen.

Decode the current VOP candidate;
Decode the next VOP candidate (=not decode the current VOP candidate for decoding);
Decode the VOP of an absolute time which has a small difference between it and the externally-set display control information 1009, that is, which is close to the externally-set display control information 1009.

(Second Case)

This is the case where the display speed is controlled at the VOP decoder side; for example, the user is allowed to determine the display speed or designate the optimum display speed according to CPU resources.

Next, the operation in this case will be described. Let it be assume that the VOP select information indicates the necessity for decoding one for every three VOPs. In this instance, the decision means 1012b judges that decoding needs to be done when the count value fed thereto from the counter part 1012a can be divided by 3 without a remainder and that decoding need not be done when the count value from the counter part 1012a is divided by 3 with a remainder 1 or 2.

In either of the first and second cases, when it is judged that the VOP candidate for decoding must be decoded, the decision means outputs a bit stream to the modulo time base analysis part 1013, and to the start code analysis part 51 when it is judged that no decoding is necessary. The modulo time base analysis part 1013 analyzes the modulo time base, and outputs a bit stream to the VOP time increment analysis part 1014.

The VOP time increment analysis part 1014 analyzes the VOP time increment, and outputs a bit stream to the video information header analysis part 57. The video information header analysis part 57 analyzes the video information header, and outputs a bit stream to the start code analysis part 51.

Next, a description will be given of the case where the VOP rate flag 1010 indicates a variable speed. The modulo time base analysis part 1013 analyzes the modulo time base, and outputs a bit stream to the VOP time increment analysis part 1014. The VOP time increment analysis part 1014 analyzes the VOP time increment, and outputs a bit stream to the VOP-to-be-decoded determining part (2) 1015.

Based on the modulo time base analyzed in the modulo time base analysis part 1013, the VOP time increment analyzed in the VOP time increment analysis part 1014 and the time code 1011, the VOP-to-be-decoded determining part (2) 1015 generates the absolute time of the VOP candidate for decoding. And based on the generated absolute time and the externally-set display control information 1009, it determines whether to decode the VOP candidate for decoding. When it is determined that the VOP needs to be decoded, a bit stream is output to the video information header analysis part 57, and to the start code analysis part 51 when it is judged that no decoding is necessary. The video information header analysis part 57 analyzes the video information header, and outputs a bit stream to the start code analysis part 51.

According to Embodiment 5, since the bit stream with the encoded VOP rate flag and VOP rate information is multiplexed onto the VOL layer as described above, it is possible for the user to specify his desired VOP in a moment through utilization of the VOP rate flag and the VOP rate—this allows him to determine whether the VOP concerned needs to be decoded, or to synthesize a plurality of objects, simply by analyzing only the VOP start code contained in the corresponding VOP header information.

Incidentally, when the VOPs contained in the encoded VOP bit stream input into the VOP decoder are all intra-encoded, the user can specify his desired VOP in a moment and cause it to be displayed.

As described above, the decoder according to Embodiment 5 is has control means which controls the image reconstruction by specifying the display time of the image at each time for decoding on the basis of the display speed information when the display speed identification information decoded by the display speed information decoding means indicates a fixed speed and on the basis of display time information multiplexed for each image at each time in the case where the display speed identification information indicates a variable speed.

Embodiment 6

A sixth embodiment (Embodiment 6) of the present invention is directed to a modified form of the VOP decoder described above in Embodiment 5. The VOP decoder according to this embodiment has a function of specifying the VOP to be decoded on the basis of the VOP rate flag indicating whether the object display speed is fixed or variable, the VOP rate indicating the object display speed, the externally-set display control information externally set by the user, and the time code.

Figure 19:
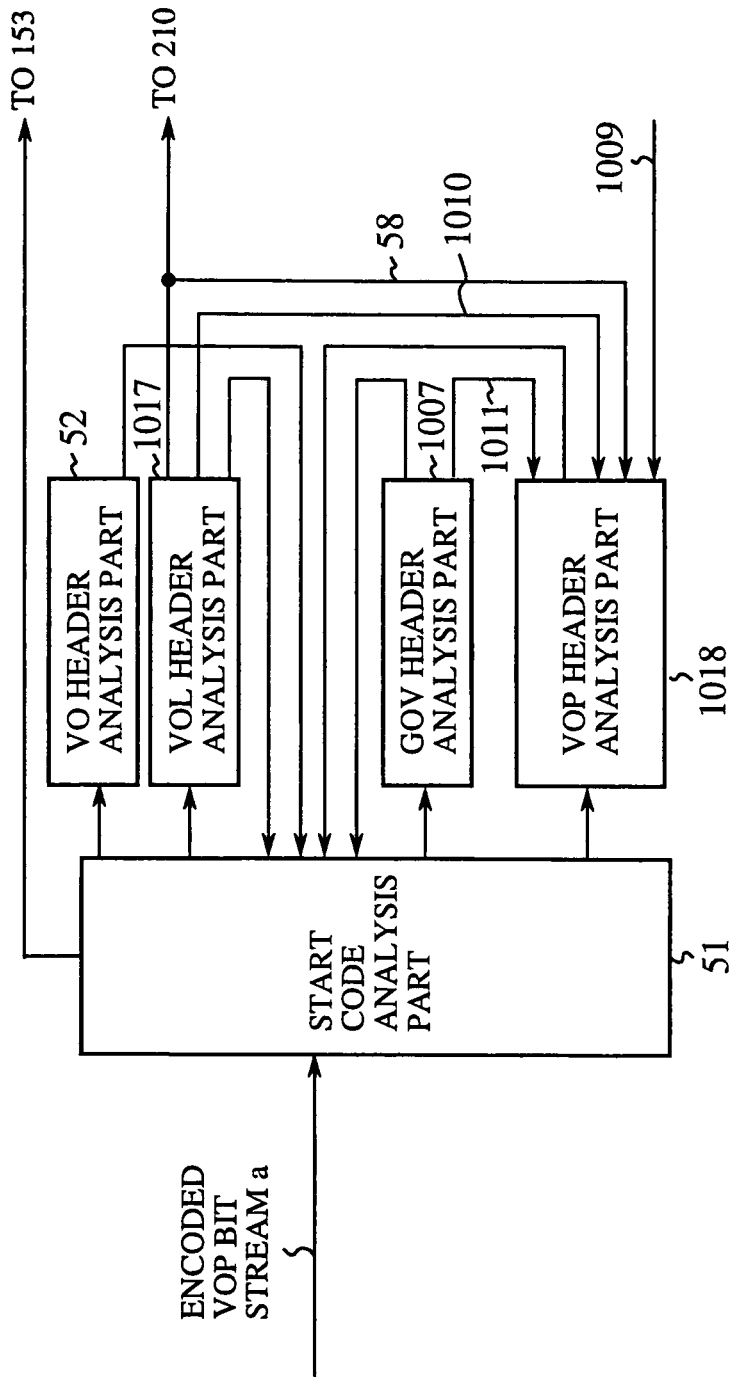
FIG. 19 is a block diagram showing an example of the configuration of a header analysis part of a VOP decoder part according to a sixth embodiment of the present invention.

FIG. 19 is a diagram depicting the header analysis part of the VOP decoder according to Embodiment 6. Since the VOP decoder of this embodiment differs from that of Embodiment 5 only in the configuration and operation of the VOL header analysis part 1006 and VOP header analysis part 1008, a description will be given in this respect alone.

A VOL header analysis part 1017 analyzes the VOL header, the VOP rate information and the VOP rate flag contained in the bit stream input thereto, and outputs the analyzed bit stream to the start code analysis part 51 and the VOP rate flag 1010 to a VOP header analysis part 1018. At the same time, it outputs the VOP rate information 58 to the VOP header analysis part 1016 when the analyzed VOP rate information indicates any fixed rate value (for example, the VOP rate indicated by VOP rate information "100" in Table 3), and the VOP rate information 58 to the VOP header analysis part 1018 and the composition part 210 when the analyzed VOP rate information indicates a particular value (for example, the VOP rates indicated by VOP rate information "000", "001", "010" and "011" in Table 3).

Figure 20:
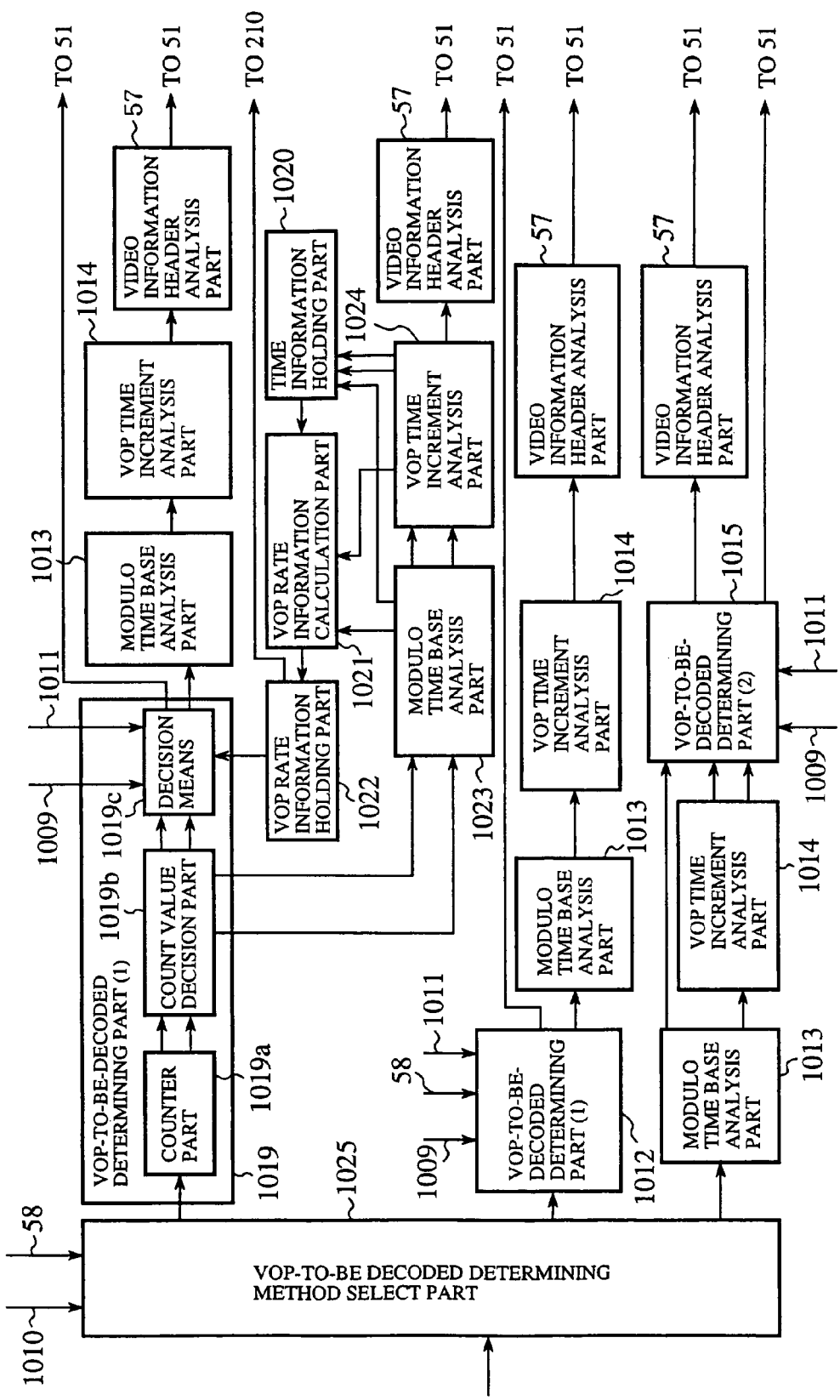
FIG. 20 is a block diagram showing an example of the configuration of a VOP header analysis part of the VOP decoder part according to the sixth embodiment.

FIG. 20 is a diagram depicting the VOP header analysis part 1018 in detail. Reference numeral 1025 denotes a VOP-to-be-decoded determining method select part, and 1019 a VOP-to-be-decoded determining part (3), which has a counter part 1919*a*, a count value decision part 1019*b* and decision means 1019*c*. Reference numeral 1020 denotes a time information holding part, 1021 a VOP rate information calculation part, 1022 a VOP rate information holding part, 1023 a modulo time base analysis part, and 1024 a VOP time increment analysis part.

Based on the VOP rate flag 1010 and the VOP rate information 58 input thereinto, the VOP-to-be-decoded determining method select part 1025 selects the destination of the input bit stream. More specifically, when the VOP rate flag 1010 indicates a fixed speed and the VOP rate information 58 indicates some fixed rate value, the VOP-to-be-decoded determining part (3) 1019 is selected as the destination. When the VOP rate flag 1010 indicates a variable speed, the operation described previously in Embodiment 5 is performed, which will not be described again. When the VOP rate flag 1010 indicates a fixed speed and the VOP rate information 59 a particular value, the bit stream is output to the VOP-to-be-decoded determining part (1) 1012. In this instance, the VOP-to-be-decoded determining part (1) 1012 and the parts following it perform the same operations as described previously in Embodiment 5; so, no description will be repeated.

A description will be given below of the case where the VOP rate flag 1010 indicates a fixed speed and the VOP rate information 58 some fixed rate value.

The counter part 1019*a* in the VOP-to-be-decoded determining part (3) 1019 increments its count value whenever the VOP start code is detected in the start code analysis part 51 and a bit stream is fed into the VOP header analysis part 1018, and it outputs the count value and the bit stream to the count value decision part 1019*b*. The count value decision part 1019*b* outputs the bit stream and the count value to the modulo time base analysis part 1023 when the count value indicates a first or second VOP, and in the other cases, it outputs the bit stream and the count value to the decision means 1019*c*.

The modulo time base analysis part 1023 analyzes the modulo time base and, when the input count value indicates the first VOP, outputs the modulo time base to the time information holding part 1020 and to the VOP rate information calculation part 1021 when the input count value indicates the second VOP, while at the same time it outputs the bit stream and the count value to the VOP time increment analysis part 1024.

The VOP time increment analysis part 1024 analyzes the VOP time increment and, when the input count value indicates the first VOP, outputs the VOP time increment to the time information holding part 1020 and to the VOP rate information calculation part 1021 when the input count value indicates the second VOP, while at the same time it outputs the bit stream to the video information header analysis part 57. The video information header analysis part 57 analyzes the video information header, and outputs the bit stream to the start code analysis part 51.

The time information holding part 1020 holds the modulo time base and the VOP time increment input thereto. Upon input thereto of the modulo time base and the VOP time increment for the second VOP, the VOP rate information calculation part 1021 reads thereinto from the time information holding part 1020 the modulo time base for the first VOP and the VOP time increment similarly for the first VOP, then calculates the VOP rate information based on them, and outputs the VOP rate information to the VOP rate information holding part 1022. When the VOP time increment is expressed with a 6-bit accuracy, the VOP rate information calculation part 1021 calculates the VOP rate as described below.

In the case where the modulo time base for the first VOP is "10", the VOP time increment for the first VOP is "000000" (that is, the time information about the first VOP is 1.0 sec), the modulo time base for the second VOP is "10" and the VOP time increment for the second VOP is "100000" (that is, the time information about the second VOP is 1.5 sec), the difference between the time information about the both is 0.5 sec. This means that the VOP to be decoded exists every 0.5 sec, that is, the VOP rate is 2/sec (which corresponds to VOP rate information "1111" in Table 3).

Even when the VOP rate information 58 is not multiplexed, if only the VOP rate flag 1010 is multiplexed, it can be judged therefrom that a fixed rate is indicated, and consequently, such operation as described above can be carried out.

The VOP rate information holding part 1022 holds the VOP rate information input thereto, and outputs the VOP rate information to the composition part 210. The operation of the decision means 1019*a* will be described below in connection with first and second cases where the externally-set display control information 1009 is provided as absolute time and where the externally-set display control information is provided as the VOP rate.

(First Case)

Based on the count value fed thereto from the count value decision part 1019*b* and the VOP rate information provided from the VOP rate information holding part 1022, the decision means 1019*c* calculates the absolute time that the VOP candidate for decoding has. When the thus calculated absolute time of the VOP candidate for decoding and the externally-set display control information 1009 are equal to each other, it is judged that decoding needs to be done.

On the other hand, when they are not equal, the absolute time of the next VOP candidate for decoding is calculated. This is intended to make comparison between the absolute time of the next VOP candidate for decoding and the absolute time of the current VOP candidate for decoding so as to ensure decoding the VOP of the absolute value closer to the externally-set display control information 1009. The absolute time of the next VOP candidate for decoding is calculated from the already calculated absolute time of the current VOP candidate and the VOP rate information 58. When this calculated value is smaller or equal to the externally-set display control information 1009, the next VOP candidate for decoding is decided to be decoded, and the current VOP candidate for decoding is not decoded. When the calculated value exceeds the externally-set display control information 1009, any of the following methods may be chosen.

Decode the current VOP candidate for decoding;

Decode the next VOP candidate for decoding (=not decode the current VOP candidate for decoding);

Decode the VOP of an absolute time which has a small difference between it and the externally-set display control information 1009, that is, which is close to the externally-set display control information 1009.

(Second Case)

When the VOP rate derived from the externally-set display control information 1009 is 2/sec and the VOP rate indicated by the VOP rate information fed from the VOP rate information holding part 1022 is 4/sec, the VOP information indicating the number of VOPs from which one VOP is selected for decoding becomes information that every other VOPs are to be decoded. In this instance, the decision means 1019*c* judges that the VOP for which the count value input thereto from the count value decision part 1019*b* can be divided by 2 without a remainder is to be decoded, and that the VOP for which the count value from the count value decision part 1019*b* is divided by 2 but with a remainder of 1 is not to be decoded.

In both of the first and second cases, when the VOP candidate for decoding is decided to be decoded, the bit stream is output to the modulo time base analysis part 1013, and when it is decided that no decoding is needed, the input bit stream is output to the start code analysis part 51. The modulo time base analysis part 1013 analyzes the modulo time base, and outputs the bit stream to the VOP time increment analysis part 1014. The VOP time increment analysis part 1014 analyzes the VOP time increment, and outputs the bit stream to the video information header analysis part 57. The video information header analysis part 57 analyzes the video information header, and outputs the bit stream to the start code analysis part 51.

As described above, according to Embodiment 6, the bit stream with the encoded VOP rate flag and VOP rate information is multiplexed onto the VOL layer, and the VOP rate information is calculated from the absolute times of the first and second VOPs when the VOP rate flag indicates a fixed speed. Hence, it is possible for the user to specify his desired VOP in a moment through utilization of the VOP rate flag and the VOP rate—this allows him to determine whether the VOP concerned needs to be decoded, or to synthesize a plurality of objects with ease, simply by analyzing only the VOP start code contained in the corresponding VOP header information with respect to an arbitrary fixed VOP rate.

Incidentally, when the VOPs contained in the encoded VOP bit stream input into the VOP decoder are all intra-encoded, the user can specify his desired VOP in a moment and cause it to be displayed.

As described above, the decoder according to Embodiment 6 has control means which controls image reconstruction by specifying the display time of the image at each time for decoding on the basis of the display speed information multiplexed for each image at each time in the case where the display speed identification information decoded by the display speed information decoding means indicates a fixed speed and the fixed speed is a value not represented by the display speed information.

Embodiment 7

A seventh embodiment (Embodiment 7) of the present invention is directed to a modified form of the VOP encoder described previously in Embodiment 1. The VOP encoder of this embodiment has a function of adding, for each VOL, the time code that defines the absolute display time of each VOP contained in the VOL concerned.

The time code mentioned herein is time information disclosed in IEC standard publication 461 for "time and control codes for video tape recorders", which is information that defines the display time of an image at each time forming a moving picture (a frame in MPEG-2 and a VOP in MPEG-4) with an accuracy of hour/minute/second. For example, in the case of performing video editing on a frame-by-frame basis by commercial video editor, the addition of this information to each frame makes it possible to access a desired frame simply by designating the value of the time code.

Since the VOP encoder of this embodiment differs from the encoder of Embodiment 1 only in the configuration and operation of the header multiplexing part 124, a description will be given in this respect alone.

Figure 21:
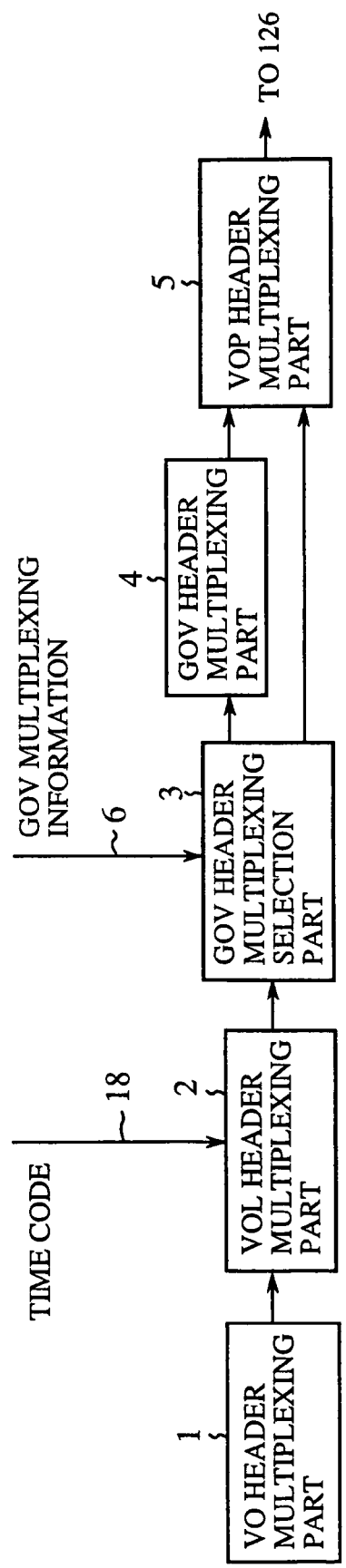
FIG. 21 is a block diagram illustrating an example of the configuration of a header multiplexing part of a VOP encoder part according to a seventh embodiment of the present invention.

FIG. 21 is a block diagram illustrating the configuration of the header multiplexing part of the VOP encoder according to Embodiment 7; the parts identical with those in Embodiment 1 of FIG. 4 are marked with the same reference numerals as in the latter, and no description will be repeated.

The operation of this embodiment will be described below. The bit stream with the VO header information multiplexed thereon in the VO header multiplexing part 1 is input into the VOL header multiplexing part 2. The VOL header multiplexing part 2 multiplexes on the input bit stream the VOL header information and a time code 18 forming the basis of time management, and outputs the bit stream to the GOV header multiplexing selection part 3.

The GOV header multiplexing selection part 3 determines the destination of the input bit stream from the VOL header multiplexing part 2 on the basis of the GOV multiplexing information 6 indicating whether to perform the multiplexing of the GOV header. When the GOV multiplexing information 6 indicates that the GOV header is not multiplexed, the bit stream is output to the VOP header multiplexing part 5. When the GOV multiplexing information 6 indicates that the multiplexing of the GOV header is performed, the bit stream is output to the GOV header multiplexing part 4. In this instance, the GOV header multiplexing part 4 multiplexes the GOV header information on the bit stream fed from the GOV header multiplexing selection part 3, and outputs the bit stream to the VOP header multiplexing part 5.

The VOP header multiplexing part 5 multiplexes the VOP start code, the time management information header and the video information header onto the input bit stream, and outputs it to the video signal multiplexing part 126 (see FIG. 3).

Incidentally, the operations of the video signal multiplexing part 126 and the parts following it are the same as described above.

According to Embodiment 7, since the time code is multiplexed onto the VOL header which is always encoded in MPEG-4 as described above, it is possible to provide a bit stream which permits the creation of a pictorial image composed of a plurality of objects on the basis of the time code. Moreover, in the case of performing edits while decoding the encoded bit stream according to Embodiment 7 by a commercial object-by-object video editor, a VOP at an arbitrary time of objects can freely be accessed randomly at all times. These effects provide increased flexibility in image synthesis.

Figure 22:
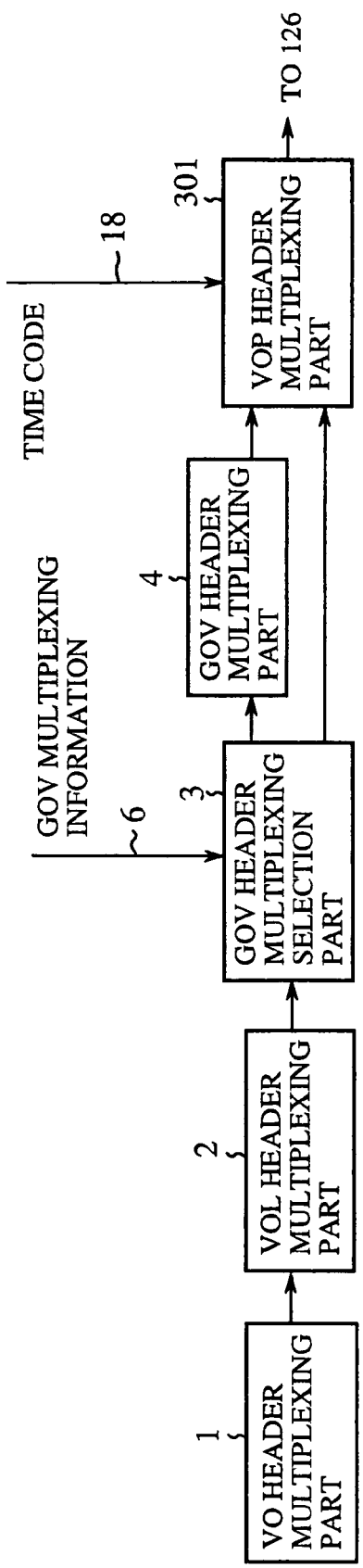
FIG. 22 is a block diagram illustrating another example of the configuration of the header multiplexing part of the VOP encoder part according to the seventh embodiment.

Incidentally, while the encoder of this embodiment has been described to add the time code for each VOL, the encoder may also be configured to add the time code information for each VOP. This could be implemented by such a configuration as shown in FIG. 22 in which the time code 18 defining the absolute display time of each VOP is input into and multiplexed by a VOP header multiplexing part 301.

Furthermore, Embodiment 7 has been described to involve the encoding of the VOP rate information, but it is a matter of course that the multiplexing of the time is independent of the VOP rate information, and even when the VOP rate information is not encoded, the same effects as mentioned above are obtainable.

As described above, the image encoding device of Embodiment 7 which encodes images on the object-by-object basis is provided with absolute time multiplexing means by which information representing the absolute time of each object is multiplexed onto an encoded image signal.

Embodiment 8

A VOP decoder according to an eighth embodiment (Embodiment 8) of the present invention decodes the time code from the VOL header contained in the encoded bit stream. The VOP decoder is applicable to a system which synthesizes a plurality of decoded objects into an image by using a plurality of such VOP decoders.

Figure 23:
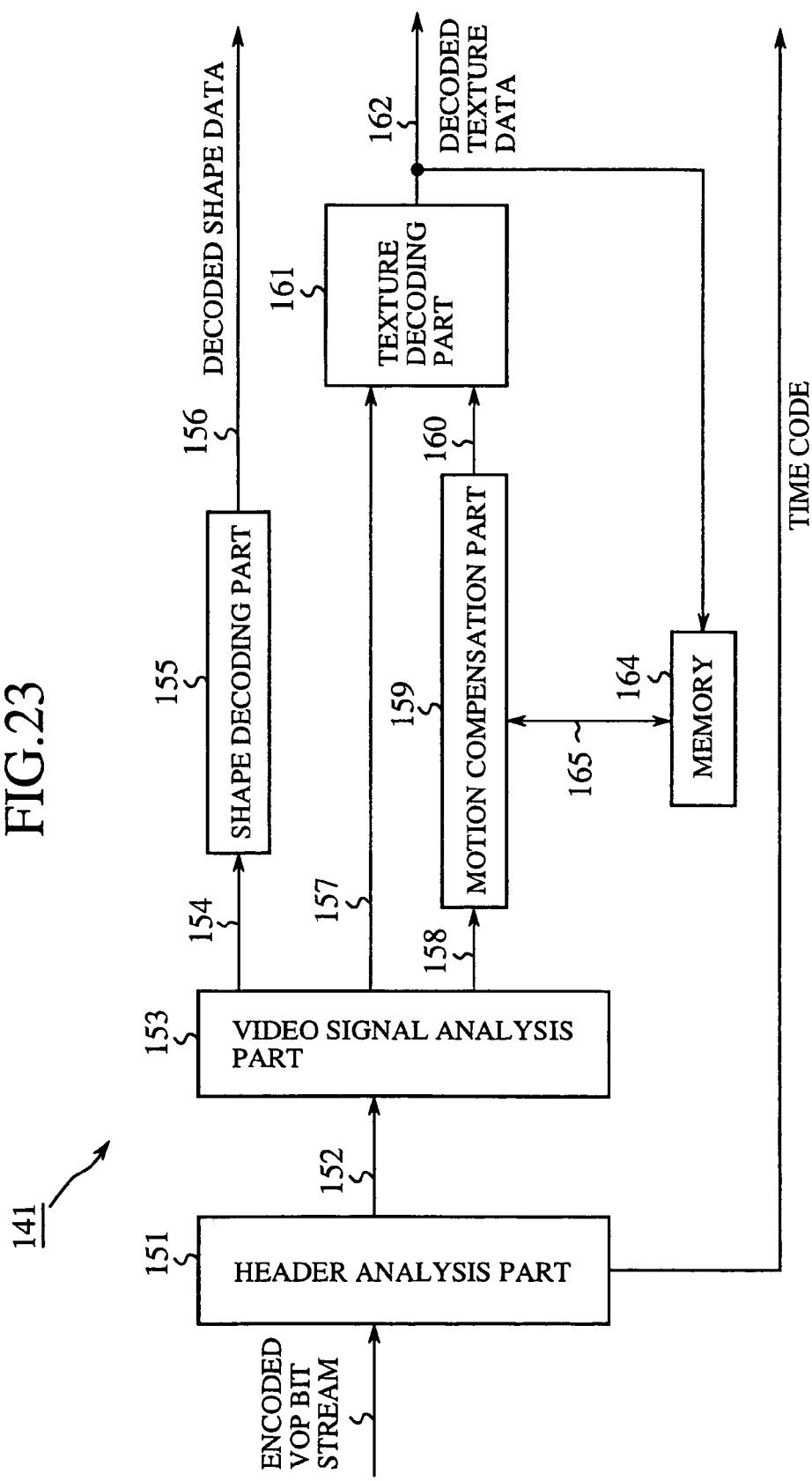
FIG. 23 is a block diagram depicting an example of the internal configuration of a VOP decoder part according to an eighth embodiment of the present invention.

A description will be given first of the configuration and operation of the VOP decoder in Embodiment 8. The internal configuration of the VOP decoder of this embodiment is depicted in FIG. 23. Since this decoder differs from the VOP decoder of Embodiment 2 only in the configuration and operation of a header analysis part 302, a description will be given below in this respect alone. The header analysis part 302 has a function of decoding and outputting the time code in the VOL header.

Figure 24:
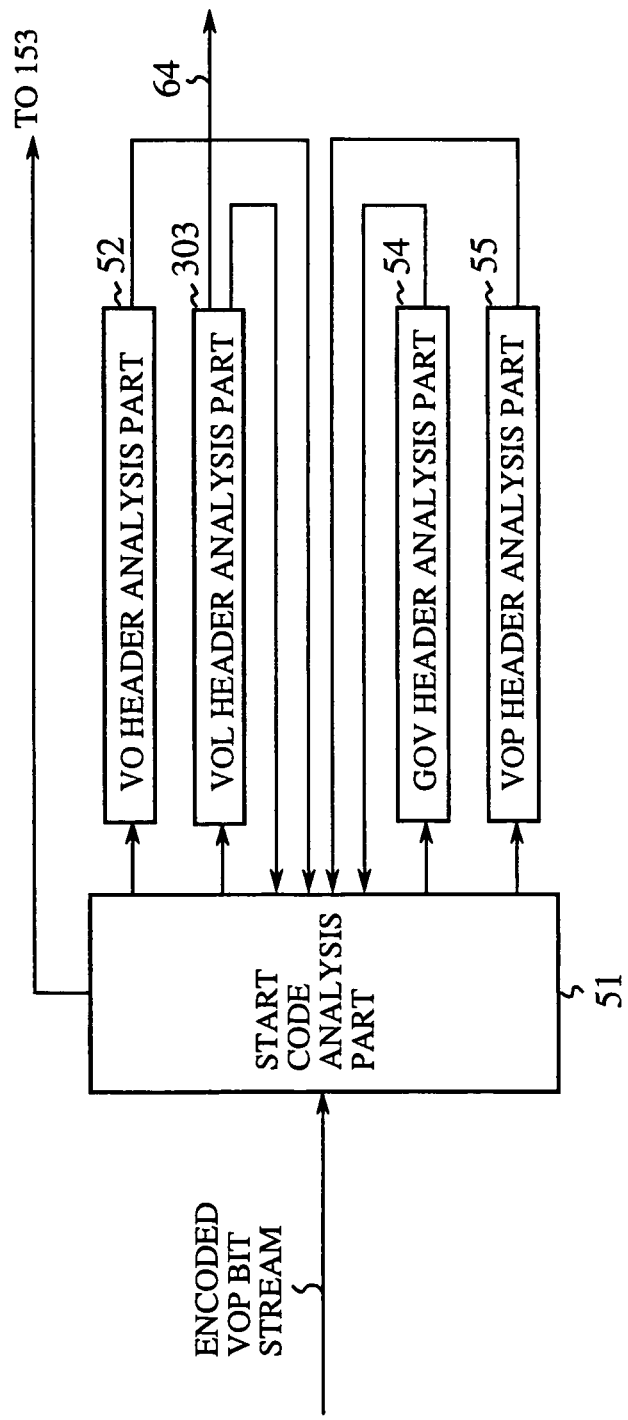
FIG. 24 is a block diagram depicting an example of the configuration of a header analysis part of the VOP decoder part according to the eighth embodiment.

FIG. 24 illustrates the internal configuration of the header analysis part 302. Reference numeral 303 denotes a VOL header analysis part. The start code analysis part 51 analyzes the start code contained in the input encoded VOP bit stream 150. The start code analysis part outputs the bit stream to the VO header analysis part 52 when the analyzed start code indicates VO, to the VOL header analysis part 303 when the start code indicates VOL, to the GOV header analysis part 54 when the start code indicates GOV, and to the VOP header analysis part 55 when the start code indicates VOP. Incidentally, upon completion of the analysis in the VOP header analysis part 55, the bit stream is fed therefrom to the video signal analysis part 153.

The VO header analysis part 52 analyzes the Vo header contained in the input bit stream, and outputs the analyzed bit stream to the start code analysis part 51. The VOL header analysis part 303 analyzes the VOL header information in the input bit stream, and outputs the analyzed bit stream to the start code analysis part 51. In this case, the time code 64 contained in the VOL header information is decoded and output. The GOV header analysis part 54 analyzes the GOV header information in the input bit stream, and outputs the analyzed bit stream to the start code analysis part 51. The VOP header analysis part 55 analyzes the VOP header information in the input bit stream, and outputs the analyzed bit stream via the start code analysis 51 to the video signal analysis part 153.

Figure 25:
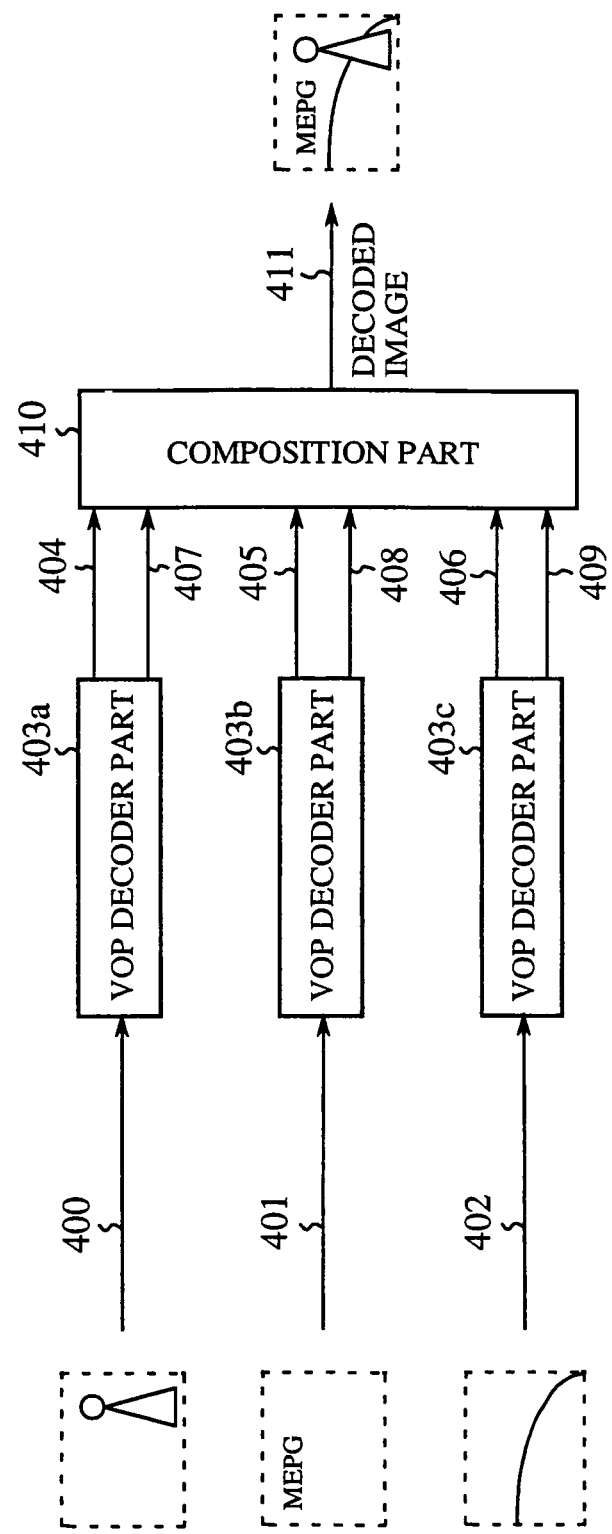
FIG. 25 is a block diagram illustrating a system for synthesizing a plurality of objects according to the eighth embodiment.

With the VOP decoder of the above configuration and operation, it is possible to output, for each VOL, the absolute display time of each VOP contained therein. In FIG. 25 there is depicted a system which uses this information to synthesize a plurality of objects.

In FIG. 25, reference numeral 400 denotes an encoded VOP bit stream a, 401 an encoded VOP bit stream b, 402 an encoded bit stream c, 403 a VOP decoder for decoding the encoded VOP bit stream a400, 403b a VOP decoder for decoding the encoded VOP bit stream b401, 403c a VOP decoder for decoding the encoded VOP bit stream c402, 404 a decoded object image c, 405 a decoded object image b, 406 a decoded object image c, 407 a time code a, 408 a time code b, 409 a time code c, 410 a composition part, and 411 a decoded image. What is intended to mean by the decoded object image is an image obtained by combining the decoded shape data 156 and the corresponding decoded texture data 162 for each of VOPs and then integrating such combined pieces of data for each group of VOPs (for example, GOV or VOL).

The encoded VOP bit stream a400 to the encoded VOP bit stream c402 are decoded by the VOP decoder parts 403a to 403c corresponding thereto, respectively, by which the decoded VOP images a404 to c406 are generated. At this time, the VOP decoders decode the corresponding time codes a407 to c409, and output them to the composition part 210. Based on the time codes a407 to c409, the composition part 210 determines the time of the frame of the decoded image 411 where to synthesize the decoded VOP of each decoded object image, and maps them into the frame corresponding to the determined time. For example, assume the following situations.

The composition part has a time code generation capability, and determines the absolute display time of each image frame to synthesize.

Assume that 01:00:00 is decoded as the time code of the first VOP of the decoded object image a404, where 01:00:00 represents (hour):(minute):(second).

Assume that 01:00:10 is decoded as the time code of the first VOP of the decoded object image b405.

Assume that 01:01:00 is decoded as the time code of the first VOP of the decoded object image c406.

Assuming that the time code of the first image frame of the decoded image 411 defined in the composition part 410 is 01:00:00, the decoded object image a404 is mapped into the first frame of the decoded image 411, the decoded object image b405 is mapped 10 seconds after the first frame of the decoded image 411, and the decoded object image c406 is mapped one minute after the first frame of the decoded image 411; thus, the decoded objects can be displayed in the respective frames. By this, it is possible to display a pictorial image with a plurality of video objects synthesized in the image frames in correspondence to the reference absolute times.

By using a plurality of such VOP decoders as described above, a simple-structured system can be implemented which synthesizes a plurality of object into a reconstructed image.

Figure 26:
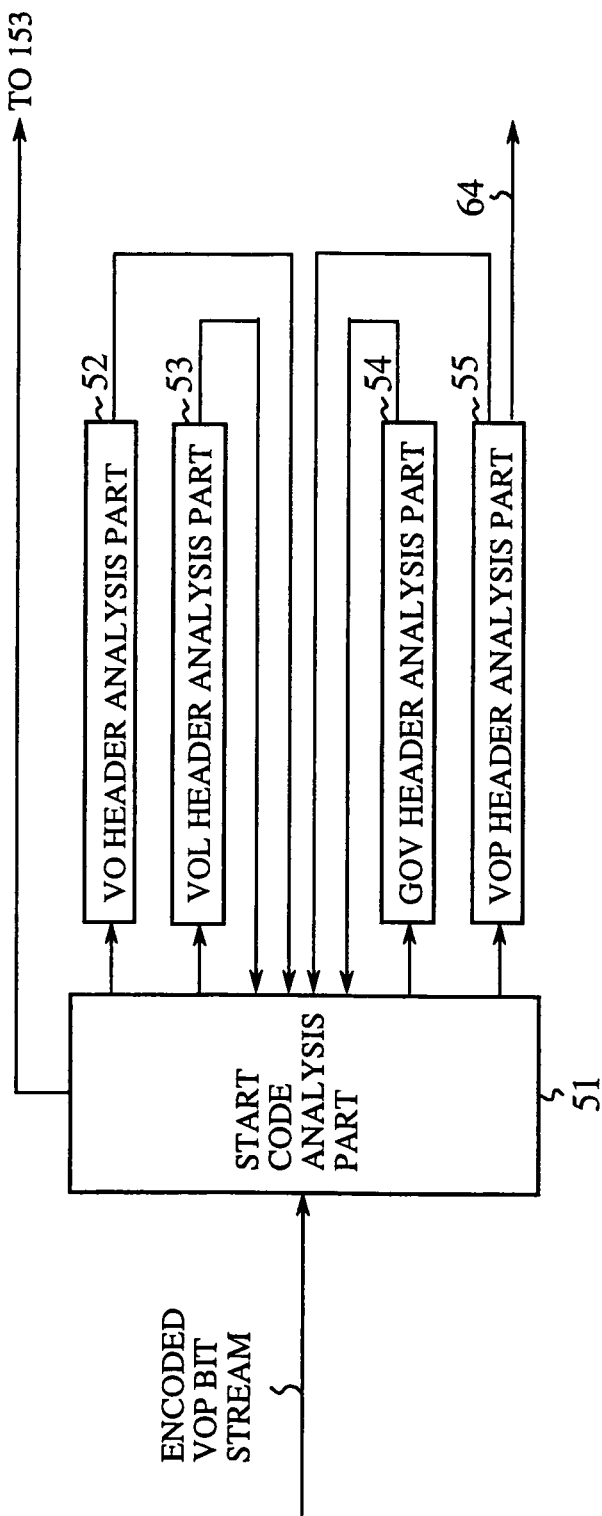
FIG. 26 is a block diagram depicting another example of the configuration of the header analysis part of the VOP decoder part according to the eighth embodiment.

The time code may also be encoded for each VOL at the image encoding device side as depicted in FIG. 26. In this case, it is possible, at the image decoding device side, to decode the time code encoded for each VOL and synthesize a plurality of objects for each VOL as described above.

Figure 27:
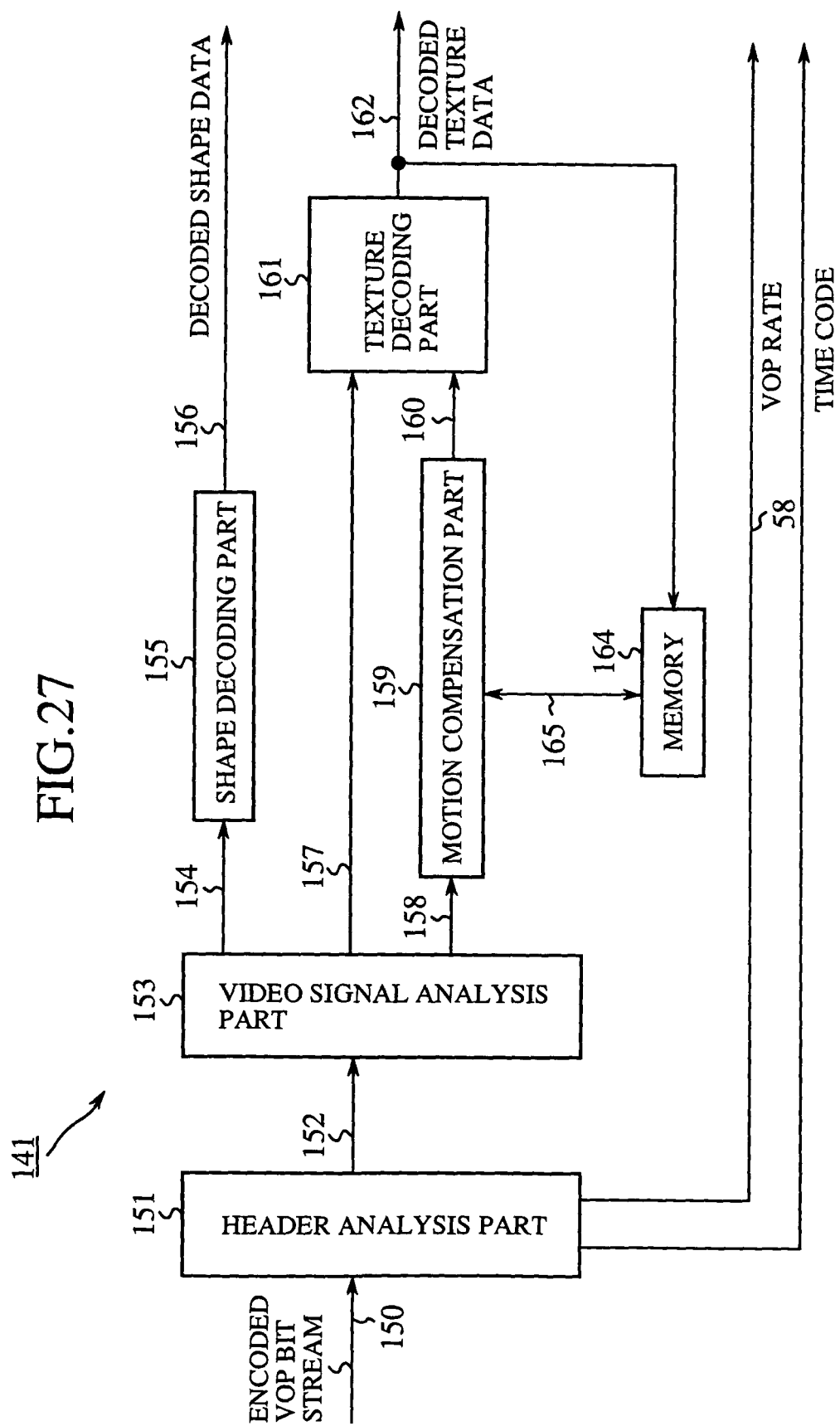
FIG. 27 is a block diagram depicting another example of the internal configuration of the VOP decoder part according to the eighth embodiment.

FIG. 27 shows a modification of the VOP decoder of the type that it is supplied with an encoded bit stream with the VOP rate multiplexed onto the VOL header together with the time code. With this configuration, it is possible to determine the absolute display time of the first VOP of the VOL by the time code and then detect the absolute display time of each VOP from the VOP rate information—this allows more ease in implementing a system that synthesizes a plurality of objects.

While in the above a plurality of VOP decoders of this embodiment employs have been described as being applied to the system for synthesizing a plurality of objects, only one such VOP decoder may be used in a system that decodes only one object to reconstruct an image.

As described above, according to Embodiment 8, the image decoding device which decodes the bit stream encoded from an image on an object-by-object basis is provided with: absolute time analysis means for analyzing, for each object, information indicating the absolute time therefor; and means for reconstructing the image processed on the object-by-object basis through utilization of the information indicating the absolute time analyzed by the absolute time analysis means.

Embodiment 9

A ninth embodiment (Embodiment 9) of the present invention is directed to a VOP encoder that implements an improved scheme for encoding the modulo time base (corresponding to first time information) which is used in combination with the VOP time increment (corresponding to second time information) in MPEG-4.

A description will be given first of how the modulo time base is indicated in MPEG-4.

As described previously in Embodiment 1, the value of the modulo time base is information that indicates what number of seconds will pass until the VOP concerned is displayed after a certain reference time as shown in FIG. 5, and the information expresses the number of seconds in terms of the number of bits of the value "1." The end of the data is clearly indicated by the value "0" added thereto. That is, when the display is provided after 5 seconds, the information becomes "111110." With this method, when the reference time does not change at all, the amount of information of the modulo time base increases infinitely. At present, MPEG-4 defines the reference time by the time code that is multiplexed onto the GOV header, but since the GOV header is an option, the GOV header need not always be encoded under MPEG-4 prescriptions. For this reason, there is a fear that the value of the modulo time base becomes longer limitlessly unless the GOV header appears. The encoder of this embodiment obviates such a problem in encoding the data of the modulo time base.

Since the encoder of this embodiment can be implemented by changing the configuration and operation of only the header multiplexing part 124 in the VOP encoders described above, a description will be given in this respect alone.

Figure 28:
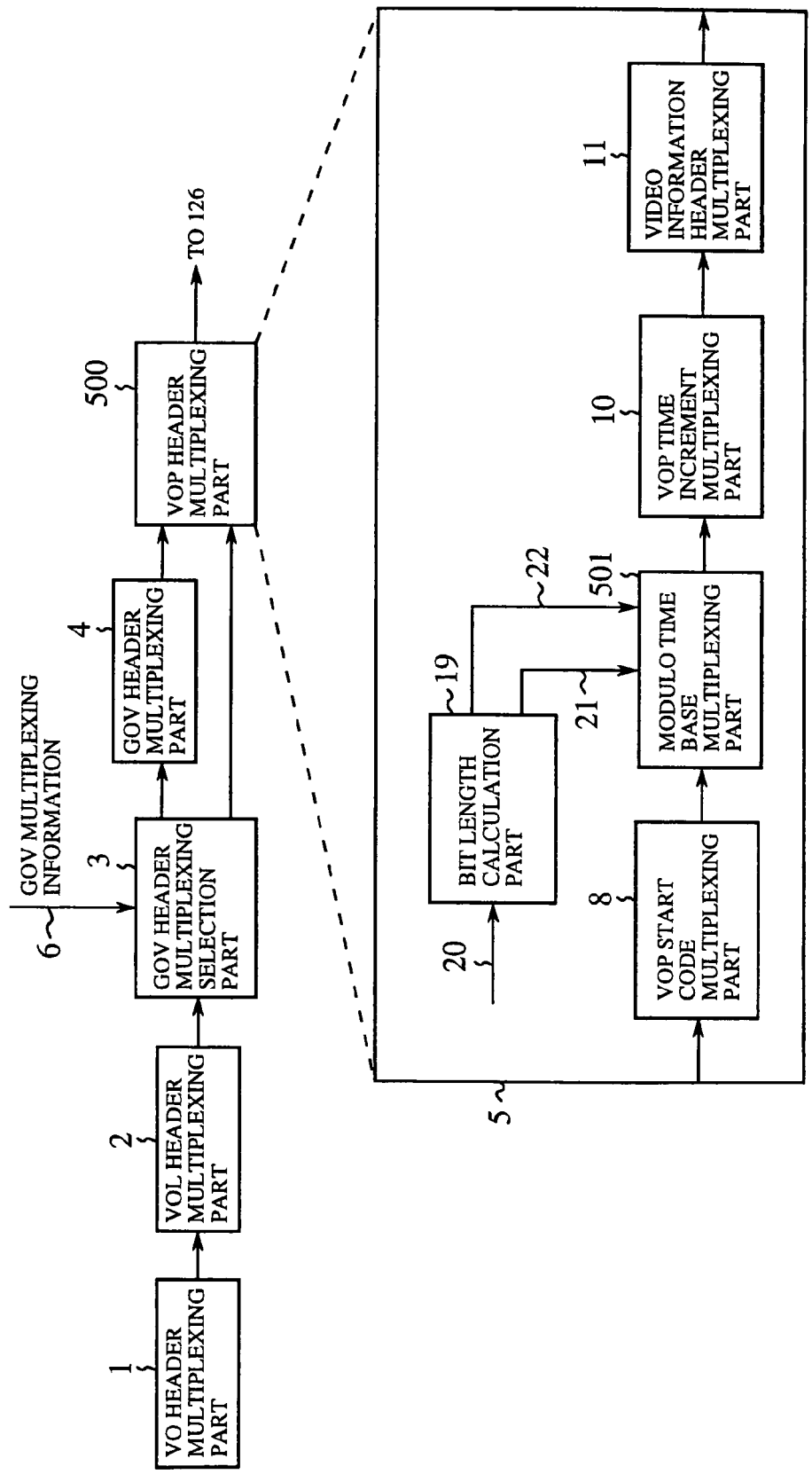
FIG. 28 is block diagram showing an example of the configuration of a header multiplexing part of a VOP encoder part according to a ninth embodiment of the present invention.

FIG. 28 illustrates the internal configuration of the header multiplexing part 124 in Embodiment 9. Reference numeral 500 denotes a VOP header multiplexing part, 19 a bit length calculating part, 20 a modulo time base, 21 a shifted modulo time base, 22 an information bit indicating a repeat count, and 501 a modulo time base multiplexing part.

Next, the operation of this embodiment will be described. The bit stream with the VO header information multiplexed thereon in the VO header multiplexing part 1 is input into the VOL header multiplexing part 2. The VOL header multiplexing part 2 multiplexes the VOL header information onto the input bit stream, and outputs the multiplexed bit stream to the GOV header multiplexing selection part 3.

The GOV header multiplexing selection part 3 determines the destination of the bit stream from the VOL header multiplexing part 2 according to the GOV multiplexing information 6 indicating whether to perform multiplexing of the GOV header. When the GOV multiplexing information 6 indicates that the GOV header is not multiplexed, the bit stream is output to the VOP header multiplexing part 5. When the GOV multiplexing information 6 indicates that the GOV header is multiplexed, the bit stream is output to the GOV multiplexing part 4. In this case, the GOV header multiplexing part 4 multiplexes the GOV header information onto the bit stream from the GOV header multiplexing selection part 3, and outputs the multiplexed bit stream to the VOP header multiplexing part 5.

The VOP start code multiplexing part 8 in the VOP header multiplexing part 500 multiplexes the VOP start code onto the input bit stream, and outputs the multiplexed bit stream to the modulo time base multiplexing part 501. The bit length calculating part 19 in the VOP header multiplexing part 500 compares the bit length of the modulo time base 20 and a preset positive threshold value. When the bit length of the modulo time base 20 is longer than the threshold value, the modulo time base 20 is left-shifted repeatedly by the length of the threshold value until the bit length of the modulo time base becomes shorter than the threshold value. The bit length calculating part 10 outputs the thus shifted modulo time base 21 in the form of a bit string and the information bit 22 which indicates the shift-repeat count. The information bit 22 indicating the shift-repeat count may be provided as a binary number that expresses the shift-repeat count by a predetermined number of bits, or as a variable bit length that expresses the shift-repeat count by a variable-length code.

The operation of the bit length calculation part 19 will be concretely described below. With the abovesaid threshold value set at 4, if the modulo time base 20 is "1111111110," the shift-repeat count is two and the shifted modulo time base 21 is "10." If expressed by a fixed two-bit length, the information bit 22 indicating the shift-repeat count is "10."

The modulo time base multiplexing part 501 in the VOP header multiplexing part 500 multiplexes onto the bit stream from the VOP start code multiplexing part 8 the shifted modulo time base 21 and the information bit 22 indicating the shift-repeat count, and outputs the multiplexed bit stream to the VOP time increment multiplexing part 10.

The VOP time increment multiplexing part 10 multiplexes the VOP time increment onto the bit stream from the modulo time base multiplexing part 10, and outputs the multiplexed bit stream to the video information header multiplexing part 11. The video information header multiplexing part 11 multiplexes the video information header onto the bit stream from the VOP time increment multiplexing part 10, and outputs the multiplexed bit stream to the video signal multiplexing part 26.

As described above, according to Embodiment 9, the modulo time base is expressed by two kinds of information bits (the shifted modulo time base and the information bit indicating the shift-repeat count). And these two kinds of information bits are multiplexed instead of multiplexing the modulo time base expressed as prescribed in MPEG-4 at present. Hence, the VOP encoder of this embodiment permits suppression of the amount of information generated suppressed as compared with that in the case of using the method according to MPEG-4.

As described above, the image encoding device of Embodiment 9 which encodes images on the object-by-object basis is provided with time information encoding means which encodes, as information defining the display time of an image at each time on the object-by-object basis, the first time information defining the time interval between the reference time and the display time, the second information defining the display time with a higher accuracy than that of the time defined by the first time information and the image corresponding to each time. The time information encoding means expresses the first time information by conversion into a bit length. When the bit length of the first time information is longer than a predetermined set value, a bit shift corresponding to the set value is repeated until the bit length becomes shorter than the set value, and at the same time, the number of bit shifts is counted. Then the shift-repeat count and the bit string obtained by the repetitions of the bit shift are encoded.

Embodiment 10

A tenth embodiment (Embodiment 10) of the present invention is directed to a VOP decoder which decodes the modulo time base information multiplexed onto the encoded bit stream in the modulo time base multiplexing part described above in Embodiment 9 and uses the decoded information and the VOP time increment to define the display time of each VOP.

Since the VOP decoder of this embodiment differs from the VOP decoders described so far only in the configuration and operation of the header analysis part 151, a description will be given in this respect alone.

Figure 29:
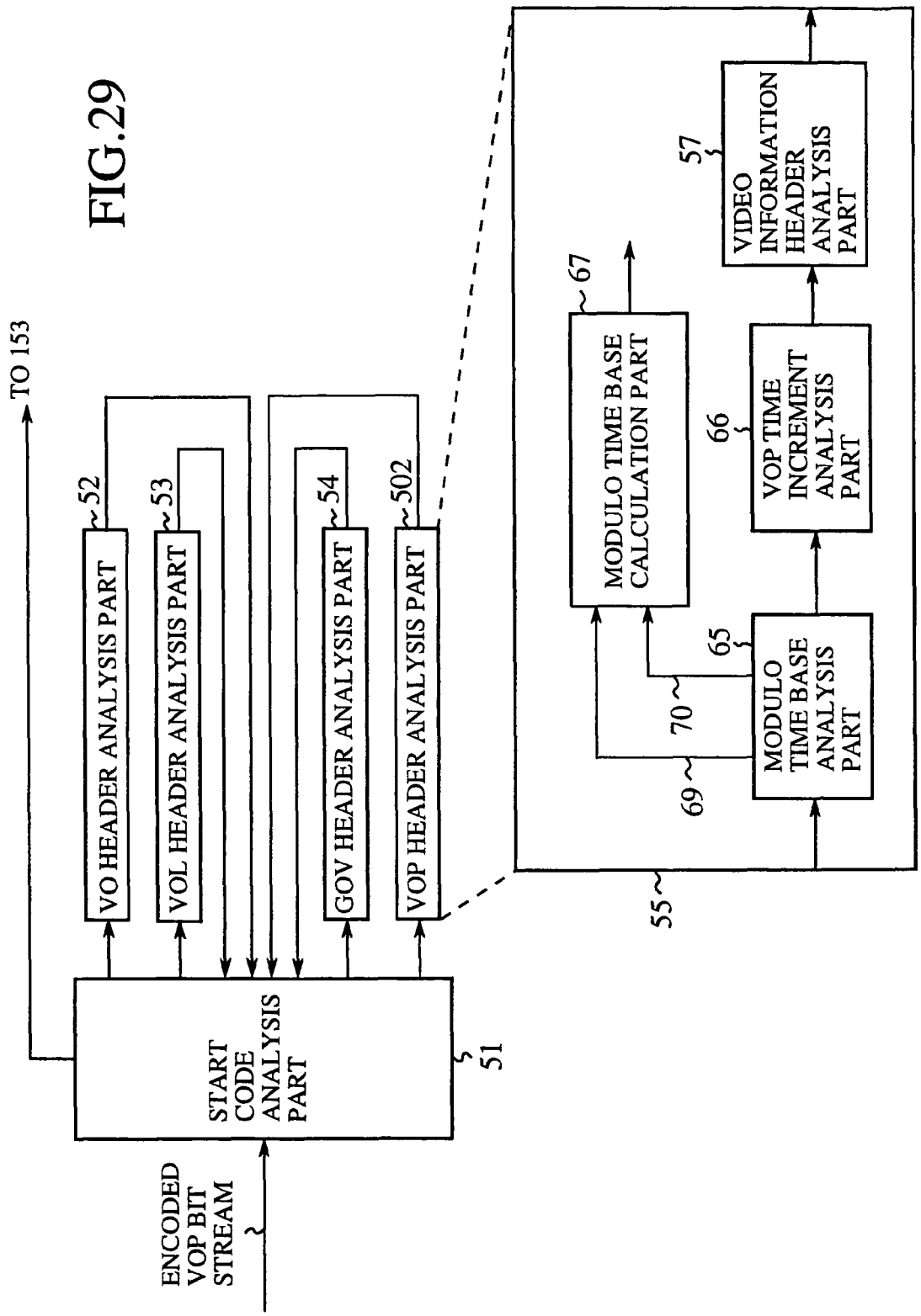
FIG. 29 is a block diagram illustrating an example of the configuration of a header analysis part of a VOP decoder part according to a tenth embodiment of the present invention.

FIG. 29 illustrates the internal configuration of the header analysis part 151 of the VOP decoder according to Embodiment 10. Reference numeral 502 denotes a VOP header analysis part, 65 a modulo time base analysis part, 66 a VOP time increment analysis part, 67 a modulo time base calculation part, 69 a shifted modulo time base, and 70 an information bit indicating a shift-repeat count.

Next, the operation of this embodiment will be described. The start code analysis part 51 analyzes the start code contained in an encoded bit stream having multiplexed thereon the input shifted modulo time base 69 and the information bit 70 indicating the shift-repeat count. The start code analysis part 51 outputs the bit stream 152 to the VO header analysis part 52 when the analyzed start code is contained in the VO header, to the VOL header analysis part 53 when the start code is contained in the VOL header, to the GOV header analysis part 54 when the start code is contained in the GOV header, to the VOP header analysis part 55 when the start code is contained in the VOP header, and to the video signal analysis part 153 (see FIG. 11) when the start code is contained in the VOP data information. The operations of the video signal analysis part and the parts following it are the same as described so far.

The modulo time base analysis part 65 in the VOP header analysis part 502 analyzes the shifted modulo time base 69 and the information bit 70 indicating the shift-repeat count contained in the bit stream fed from the start code analysis part 51, and outputs the shifted modulo time base 69 and the information bit 70 indicating the shift-repeat count to the modulo time base calculation part 67 and the bit stream to the VOP time increment analysis part 66.

The modulo time base calculation part 67 calculates the modulo time base from the shifted modulo time base 69 and the information bit 70 indicating the shift-repeat count, and outputs it to the composition part 210. More specifically, the value of the modulo time base is restored by reversing the procedure described previously with reference to Embodiment 9. In the case where a preset positive threshold value (The decoder side also required to set exactly the same value as the threshold value described in respect of the encoder of Embodiment 9) and the shifted modulo time base 69 is "10" and the information bit 70 indicating the shift-repeat count is "10," "1111111110" with "11111111" added to the high-order bit of "10" is the restored value of the modulo time base. The thus obtained restored value of the modulo time base is used to define the display time of the VOP concerned, together with the VOP time increment information.

The VOP time increment analysis part 66 analyzes the VOP time increment contained in the bit stream fed from the modulo time base analysis part 65, and outputs the analyzed bit stream to the video information header analysis part 57. The video information header analysis part 57 analyzes the video information header contained in the bit stream fed from the VOP time increment analysis part 66, and outputs the analyzed bit stream to the video signal analysis part 153.

As described above, the decoder of Embodiment 10 is configured to calculate the modulo time base from the two kinds of information bits (the shifted modulo time base and the information indicating the shift-repeat count); hence it is possible to analyze the bit stream described later in Embodiment 12 which has a smaller amount of information generated than that by the encoded representation prescribed in MPEG-4.

As described above, the image decoding device of Embodiment 10 which decodes a bit stream with images encoded on the object-by-object basis is provided with: time information decoding means which decodes, as information defining the display time of an image at each time on the object-by-object basis, the first time information defining the time interval between the reference time and the display time, the second information defining the display time with a higher accuracy than that of the time defined by the first time information, and the image corresponding to each time; and decoding and synthesizing means which decodes the input encoded image signal on the object-by-object basis and synthesizes these decoded image signals. The time information decoding means decodes the bit-shift repeat count and the shifted bit string and decodes the first time information by adding the bit string with a code of the length of the predetermined set value by the number of bit-shift repetitions, and the decoding and synthesizing means synthesizes the decoded image signal on the basis of the first and second time information decoded by the time information decoding means.

Embodiment 11

An eleventh embodiment (Embodiment 11) of the present invention a VOP encoder that implements another improved scheme for encoding the modulo time base which is used in combination with the VOP time increment in MPEG-4.

Since the VOP encoder of this embodiment differs from the VOP encoders described so far only in the configuration and operation of the header multiplexing part 124, a description will be given in this respect alone.

Figure 30:
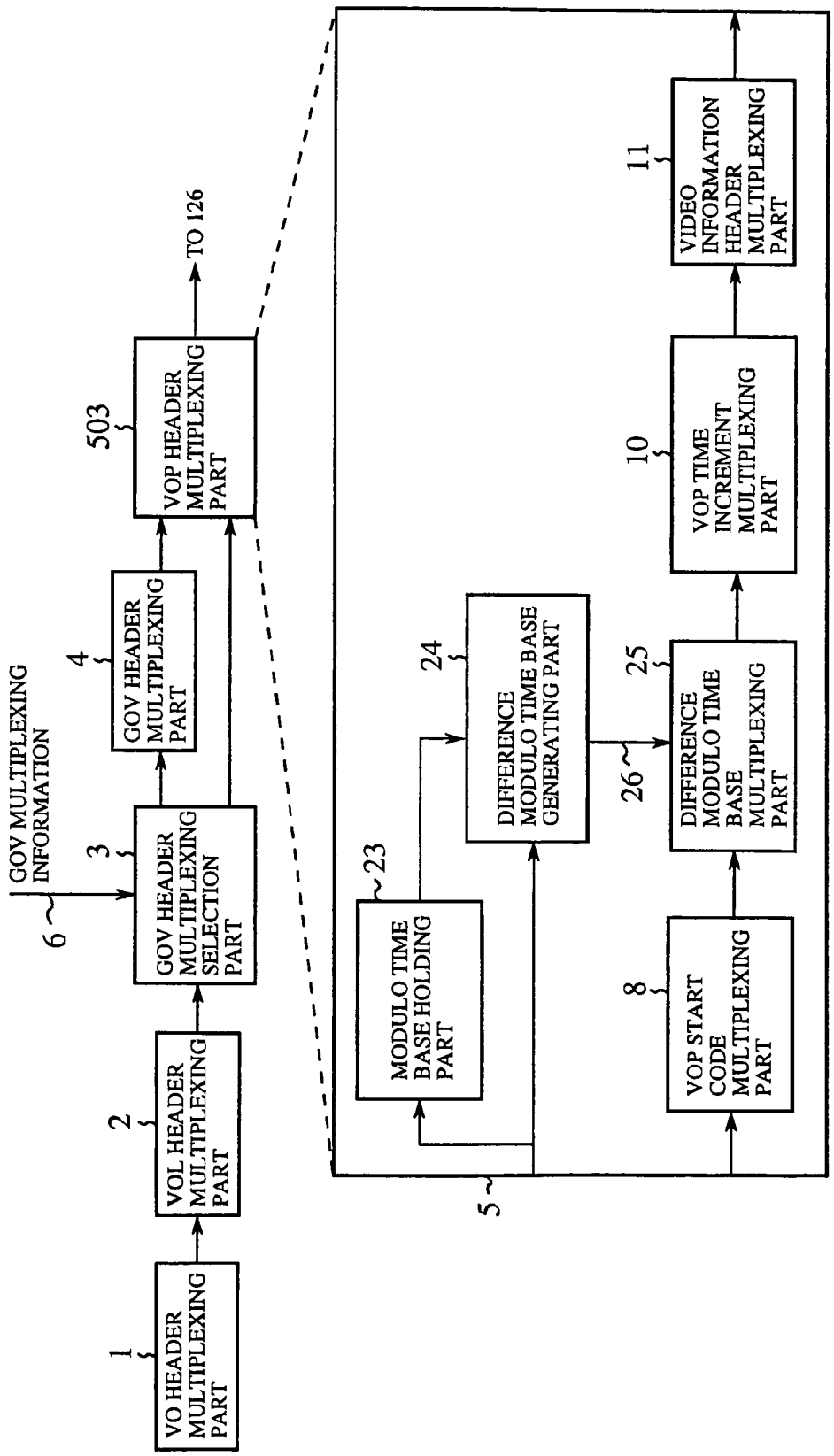
FIG. 30 is a block diagram illustrating an example of the configuration of a header multiplexing part of a VOP encoder part according to an eleventh embodiment of the present invention.

FIG. 30 illustrates the internal configuration of the header multiplexing part 124 of the VOP encoder according to Embodiment 11. Reference numeral 503 denotes a VOP header multiplexing part, 23 a modulo time base holding part, 24 a difference modulo time base generating part, 25 a difference modulo time base multiplexing part, and 26 a difference modulo time base.

The VOP start code multiplexing part 8 in the VOP header multiplexing part 503 multiplexes the VOP start code onto the input bit stream, and outputs the multiplexed bit stream to the difference modulo time base multiplexing part 25.

The modulo time base holding means 23 in the VOP header multiplexing part 503 holds the value of the modulo time base of the immediately previously encoded VOP, and after modulo time base of the immediately preceding encoded VOP is output therefrom, the modulo time base of the VOP to be encoded is written in the modulo time base holding part.

The difference modulo time base generating part 24 in the VOP header multiplexing part 503 calculates a bit string of the difference between the modulo time base of the immediately preceding encoded VOP input thereinto from the modulo time base holding part 23 and the modulo time base of the VOP to be decoded. Then the difference modulo time base generating part 24 calculates the difference modulo time base 26 based on the number of bits "1" contained in the calculated difference bit string, and outputs it to the difference modulo time base multiplexing part 25.

Now, a concrete example of the generation of the difference modulo time base will be described.

In the case where the modulo time base of the immediately previously encoded VOP is "11110" (decimal numeral: 30) and the modulo time base of the VOP to be encoded is "111110" (decimal numeral: 62), the difference bit string becomes "100000" (decimal numeral: 32). Then, the number of bits "1" contained in the thus calculated difference bit string "100000" is one. In the case of calculating the difference modulo time base by such a conversion table as Table 2, the difference modulo time base corresponding to one bit "1" is "10," and consequently, "10" is output as the difference modulo time base. Table 2 is an example of the conversion table, and other conversion tables may also be defined.

Also it is possible to obtain the difference modulo time base simply by making a comparison of bit lengths alone. For example, in the above example the bit length of the modulo time base of the immediately previously encoded VOP is 5 and the bit length of the modulo time base of the VOP to be encoded is 6; therefore, a value of 1 is obtained as the difference. By using this value as a substitute for the "number of bits "1" contained in the difference bit string" in Table 2, the difference modulo time base can be expressed.

The difference modulo time base multiplexing part 25 in the VOP header multiplexing part 503 multiplexes the difference modulo time base 26 onto the input bit stream, and outputs the multiplexed bit stream to the VOP time increment multiplexing part 10.

The VOP time increment multiplexing part 10 in the VOP header multiplexing part 503 multiplexes the VOP time increment onto the bit stream fed from the difference modulo time base multiplexing part 25, and outputs the multiplexed bit stream to the video information header multiplexing part 11.

As described above, the encoder according to Embodiment 11 is adapted to express the modulo time base as the difference modulo time base and multiplex the difference modulo time base instead of encoding the modulo time base in the form presently prescribed in MPEG-4; hence, the amount of information generated can be made smaller than in the case of using the method prescribed in MPEG-4.

As described above, the image encoding device of Embodiment 11 which encodes images on the object-by-object basis is provided with time information encoding means which encodes, as information defining the display time of an image at each time on the object-by-object basis, the first time information defining the time interval between the reference time and the display time, the second information defining the display time with a higher accuracy than that of the time defined by the first time information and the image corresponding to each time. The time information encoding means has first time information holding means for holding the first time information encoded for the image at the immediately preceding time, and calculates a bit string of the difference between the first time information of the image to be encoded and the first time information of the image at the immediate preceding time provided from the first time information holding means, and encodes the difference bit string as the first time information of the image to be encoded.

Embodiment 12

A twelfth embodiment (Embodiment 12) of the present invention is directed to a VOP decoder which restores the value of the modulo time base of the VOP concerned from information about the difference modulo time base multiplexed onto the encoded bit stream in the difference modulo time base multiplexing part 25 described above in Embodiment 11 and uses the restored modulo time base value to define the display time of each VOP.

Since the VOP decoder of this embodiment differs from the VOPs described so far only in the configuration and operation of the header analysis part 151, a description will be given in this respect alone.

Figure 31:
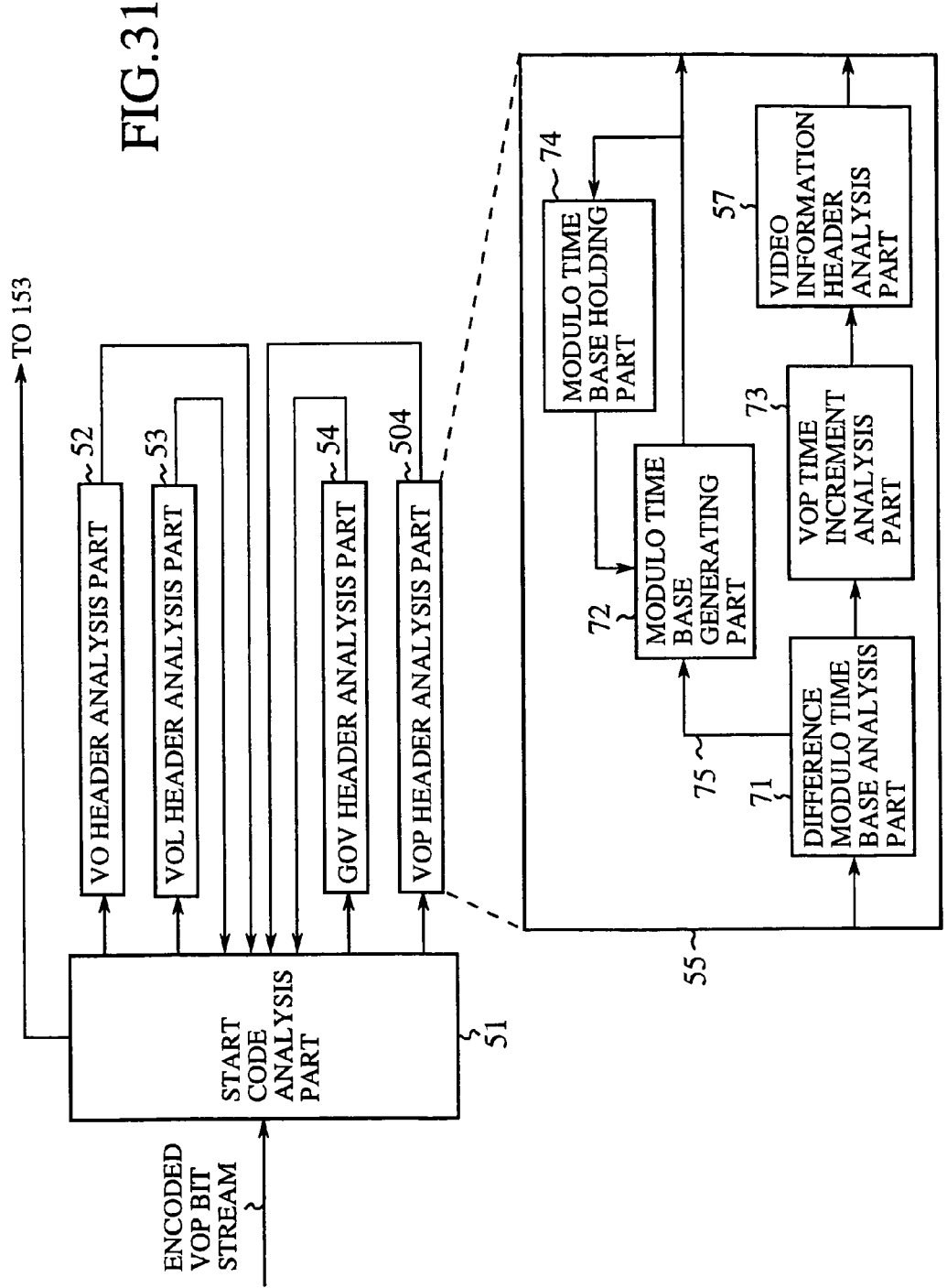
FIG. 31 is a block diagram illustrating an example of a header analysis part of a VOP decoder part according to a twelfth embodiment of the present invention.

FIG. 31 illustrates the internal configuration of the header analysis part 151 of the VOP decoder according to Embodiment 12. Reference numeral 504 denotes a VOP header analysis part, 71 a difference modulo time base analysis part, 72 a modulo time base generating part, 73 a VOP time increment analysis part, 74 a modulo time base holding part, and 75 a difference modulo time base.

The difference modulo time base analysis part 71 in the VOP header analysis part 504 analyzes the difference modulo time base 75 contained in a bit stream fed from the start code analysis part 51, and outputs the analyzed difference modulo time base 75 to the modulo time base generating part 72 and the analyzed bit stream to the VOP time increment analysis part 73.

The modulo time base generating part 72 in the VOP header analysis part 504 calculates the number of bits "1" contained in the bit string of the difference between the modulo time base of the immediately previously analyzed VOP and the modulo time base of the VOP to be analyzed, from the analyzed difference modulo time base 75 on the basis of the conversion table depicted as Table 3. Then the modulo time base generating part 72 generates a modulo time base from the calculated number of bits "1" and the modulo time base of the immediately previously analyzed VOP available from the modulo time base holding part 74, and outputs the thus generated modulo time base to the modulo time base holding part 74.

A concrete example of the generation of the modulo time base will be described. Assume that the analyzed difference modulo time base is "10" and that the modulo time base analyzed immediately previously and held in the modulo time base holding part is "11110." In the case of calculating from the conversion table shown in Table 3 the number of bits "1" contained in the bit string of the difference between the modulo time base of the immediately previously analyzed VOP and the modulo time base of the VOP to be analyzed, it is known that the number of bits "1" contained in the difference bit stream corresponding to the difference modulo time base "10" is one. Then, one bit "1" is added to the most significant bit of the modulo time base "11110" of the immediately previously analyzed VOP to obtain a modulo time base. The conversion table of Table 2 is an example, and other conversion tables may also be defined and used. The restored value of the modulo time base is used to define the display time of the VOP concerned, together with the VOP time increment information.

Furthermore, the "number of bits "1" contained in the bit string of the difference between the modulo time base of the immediately previously analyzed VOP and the modulo time base of the VOP to be analyzed" may also be a bit stream encoded as the "difference value between the bit length of the modulo time base of the immediately previously analyzed VOP and the bit length of the modulo time base of the VOP to be analyzed." In this case, the interpretation of such a conversion table as Table 2 needs only to be changed.

The modulo time base holding part 74 in the VOP header analysis part 504 holds the modulo time base of the immediately previously analyzed VOP, and after modulo time base of the immediately preceding encoded VOP is output therefrom, the modulo time base of the VOP to be encoded is input into the modulo time base holding part.

The VOP time increment analysis part 73 in the VOP header analysis part 504 analyzed the VOP time increment contained in the bit stream fed from the difference modulo time base analysis part 71, and outputs the analyzed bit stream to the video information header analysis part 57.

As described above, the decoder of Embodiment 12 is adapted to calculate the modulo time base from the difference time modulo base with a small amount of information; hence it is possible to analyze the bit stream described previously in Embodiment 8 which has a smaller amount of information generated than that by the encoded representation prescribed in MPEG-4.

As described above, the image decoding device of Embodiment 12 which decodes a bit stream with images encoded on the object-by-object basis is provided with: time information decoding means which decodes, as information defining the display time of an image at each time in an image series, the first time information defining the time interval between the reference time and the display time and second information defining the display time with a higher accuracy than that of the time defined by the first time information and the image corresponding to each time; and decoding and synthesizing means for decoding the input encoded image signal on the object-by-object basis and synthesizing these decoded image signals. The time information decoding means holds the first time information of the immediately previously decoded image, then adds the first time information of the immediately previously decoded image available from the first time information holding means to a bit string decoded as the first time information of the image to be decoded, thereby decoding the first time information of the image to be decoded. The decoding and synthesizing means synthesizes the decoded image signal on the basis of the first and second time information decoded by the time information decoding means.

Embodiment 13

While in the above there have been described the image encoding device of the type that multiplexes the display speed information onto the encoded image signal and the image encoding device of the type that multiplexes the absolute time information onto the encoded image signal, it is also possible to implement an image encoding device which multiplexes both the display speed information and the absolute time information onto the encoded image signal.

This can be done by a parallel or series arrangement of display speed information multiplexing means and absolute time information multiplexing means in the respective image encoding device described above.

The same goes for the image decoding device side. To put it simply, there have been described above the image decoding device of the type that decodes the display speed information and uses this decoded display speed information to reconstruct images processed on the object-by-object basis and the image decoding device of the type that decodes the absolute time information and uses the decoded absolute time information to reconstruct images processed on the object-by-object basis. It is also possible, however, to implement an image decoding device which reconstructs the images processed for each object on the basis of the display speed information and the absolute time information.

This can be done by a parallel or series arrangement of the display speed information decoding part and the absolute time information decoding part in the respective decoding device described above so that images processed for each object are reconstructed based on the information decoded in each decoding part.

With the above configuration, the image restoration and synthesis can be performed more smoothly and more accurately.

Embodiment 14

While in the there have been described the image encoding device of the type that multiplexes the display speed information on the encoded image signal and the image encoding device of the type that encodes and multiplexes the first time information, the second time information and the image, it is also possible to implement an image encoding device which encodes and multiplexes the display speed information, the first time information, the second time information and the image.

This can be done by a parallel or series arrangement of display speed information multiplexing means and first and second time information and image multiplexing means in the image encoding device described so far.

The same goes for the image decoding device side. To put it briefly, there have been described above the image decoding device of the type that decodes the display speed information and, based on the decoded display speed information, reconstructs images processed for each object and the image decoding device of the type that decodes the first time information, the second time information and the image and, based on the decoded first time information, second time information and image, reconstructs the image. It is also possible, however, to implement an image decoding device which reconstructs images on the basis of the display speed information, the decoded first and second time information.

This can be done by a parallel or series arrangement of the display speed information decoding part and the time information decoding part in the respective image decoding device described above so that images processed for each object are reconstructed based on the information decoded in each decoding part (means).

With the above configuration, the image restoration can be performed more smoothly and more accurately with a small amount of coded information sent.

Embodiment 15

While in the above there have been described the image encoding device of the type that multiplexes the absolute time information and encoded image signal and the image encoding device of the type that encodes and multiplexes the first time information, the second time information and the image, it is also possible to implement an image encoding device which encodes and multiplexes the absolute time information, the first and second time information and the image.

This can be done by a parallel or series arrangement of absolute time multiplexing means and first and second time information and image encoding and multiplexing means in the respective image encoding device described so far.

The same goes for the image decoding device side. To put it simply, there have been described above the image decoding device of the type that decodes the absolute time information and, based on the decoded absolute time information, reconstruct images processed for each object and the image decoding device of the type that decodes the first time information, the second time information and the image and reconstruct the image, based on the decoded first time information, second time information and image. It is also possible, however, to implement an image decoding device which reconstructs images on the basis of the absolute time information and the decoded first and second time information.

This can be done by a parallel or series arrangement of the absolute time information decoding part and the time information decoding part in the respective image decoding device described above so that images processed for each object are reconstructed based on the information decoded in each decoding part (means).

With the above configuration, the image restoration can be achieved more smoothly and more accurately with a small amount of coded information to send.

INDUSTRIAL APPLICABILITY

As described above, according to the present invention, the image decoding device includes a VOP decoder decoding a VOP that is image data serving as an encoding unit of a video object; and a VOL header analyzing part decoding a 1-bit VOP rate flag, contained in encoded form in a header information part of a VOL layer composed of several VOPs, for indicating that a display rate in the VOL of the VOP to be decoded by the VOP decoder is a fixed rate, thereby permitting smooth image reconstruction with a simple structure. Furthermore, the image decoding device includes a coding parameter analyzer analyzing a parameter of the encoded bit stream to restore an information to indicate that temporal distance between any two successive video frames to be displayed is constant in the video sequence by said information only, the information being analyzed prior to a decoding process for a data area representing the video frames, thereby permitting the image reconstruction with ease and with high accuracy.

What is claimed is:

1. An image decoding device which decodes an encoded bit stream of a video object comprising:
   a VOP decoder decoding a VOP that is image data serving as an encoding unit of the video object; and
   a VOL header analyzing part decoding, prior to analyzing a header of the VOP, a 1-bit VOP rate flag, contained in encoded form in a header information part of a VOL layer composed of several VOPs, for indicating that a display rate in the VOL of the VOP to be decoded by the VOP decoder is a fixed rate.

2. The image decoding device of claim 1 wherein the header information part further includes display speed information defining the number of VOPs displayed per unit time.

3. The image decoding device of claim 2 further comprising display speed information decoding means for decoding the header information part of the encoded bit stream to restore the display speed information to indicate the number of VOPs displayed per unit time.

4. An image decoding method for decoding an encoded bit stream of a video object, the method comprising:
   a VOP decoding step of decoding a VOP that is image data serving as an encoding unit of the video object; and
   a VOL header analyzing step of decoding, prior to analyzing a header of the VOP, a 1-bit VOP rate flag, contained in encoded form in a header information part of a VOL layer composed of several VOPs, for indicating that a display rate in the VOL of the VOP to be decoded by the VOP decoding step is a fixed rate.

5. The image decoding method of claim 4 wherein the header information part further includes display speed information, the display speed information defining the number of VOPs displayed per unit time.

6. The image decoding method of claim 5 further comprising decoding display speed information from the header information part of the encoded bit stream to determine the number of VOPs displayed per unit time.

7. An image decoding device which decodes an encoded bit stream formed by encoding a video sequence, comprising:
   a start code analyzer analyzing, prior to decoding a video frame, a start code in the encoded bit stream;
   a video frame decoder decoding the video frame that is image data serving as an encoding unit of the video sequence; and
   a sequence header analyzer analyzing, prior to analyzing a header of the video frame in the video sequence, a sequence parameter of the encoded bit stream to restore an information to indicate that temporal distance between any two successive video frames to be displayed is constant in the video sequence by said information only, the information being analyzed prior to a decoding process for a data area representing the video frames.

8. A method of decoding an encoded bit stream formed by encoding a video sequence, comprising:
   analyzing, prior to decoding a video frame, a start code in the encoded bit stream;
   decoding the video frame that is image data serving as an encoding unit of the video sequence; and
   analyzing, prior to analyzing a header of the video frame in the video sequence, a sequence parameter of the encoded bit stream to restore an information to indicate that temporal distance between any two successive video frames to be displayed is constant in the video sequence by said information only, the information being analyzed prior to a decoding process for a data area representing the video frames.

* * * * *